US010158502B2

(12) United States Patent
Yoshino et al.

(10) Patent No.: US 10,158,502 B2
(45) Date of Patent: Dec. 18, 2018

(54) NETWORK DEVICE THAT RELAYS COMMUNICATION

(71) Applicant: ALAXALA Networks Corporation, Kawasaki-shi, Kanagawa (JP)

(72) Inventors: Hiroyuki Yoshino, Kawasaki (JP); Motohide Noumi, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 9 days.

(21) Appl. No.: 15/403,391

(22) Filed: Jan. 11, 2017

(65) Prior Publication Data
US 2017/0214549 A1 Jul. 27, 2017

(30) Foreign Application Priority Data

Jan. 27, 2016 (JP) .................................. 2016-013505

(51) Int. Cl.
| H04L 12/66 | (2006.01) |
| H04L 12/46 | (2006.01) |
| H04L 12/741 | (2013.01) |
| H04L 12/721 | (2013.01) |

(52) U.S. Cl.
CPC ...... *H04L 12/4641* (2013.01); *H04L 12/4633* (2013.01); *H04L 45/74* (2013.01); *H04L 45/66* (2013.01)

(58) Field of Classification Search
CPC ................. H04L 12/66; H04L 12/6418; H04L 2012/6472; H04L 29/06; H04L 29/06027; H04L 65/1069; H04L 69/08; H04L 12/4633; H04L 43/0811; H04L 12/4641
See application file for complete search history.

(56) References Cited

U.S. PATENT DOCUMENTS

| 6,614,781 B1 * | 9/2003 | Elliott | H04L 12/6418 370/352 |
| 7,760,723 B1 * | 7/2010 | Daines | H04L 12/4625 370/389 |
| 8,422,514 B1 * | 4/2013 | Kothari | H04L 12/4633 370/351 |
| 2012/0236734 A1 * | 9/2012 | Sampath | H04L 12/413 370/252 |

OTHER PUBLICATIONS

Virtual eXtensible Local Area Network (VXLAN), "A Framework for Overlaying Virtualized Layer 2 Networks over Layer 3 Networks," RFC 7348, ISSN: 2070-1721, Aug. 2014.

\* cited by examiner

*Primary Examiner* — Sai Aung
(74) *Attorney, Agent, or Firm* — Mattingly & Malur, PC

(57) ABSTRACT

A network device is configured to: detect a virtual network that is unable to relay communication as a failed virtual network; identify, as a failed virtual network identifier, a virtual network identifier assigned to a combination of the failed virtual network and a physical port through which communication of the failed virtual network pass, based on mapping information; identify a first virtual tunnel end point that relays communication of the failed virtual network; identify a second virtual tunnel end point of another network device that communicates with the first virtual tunnel end point based on the tunnel information; and send, to the second virtual tunnel end point, a clear request including the failed virtual network identifier and an IP address of the first virtual tunnel end point, and the clear request being used for clearing a MAC address used in Layer 2 protocol.

15 Claims, 15 Drawing Sheets

| T222 | F301 | F302 | F303 | F304 | F305 | F306 |
|---|---|---|---|---|---|---|
| | NETWORK DEVICE | VTEP | VNI | PORT NUMBER | VLAN ID | USER |
| | 10 | VTEP11 | 1 | IF11 | 201 | A |
| | | VTEP12 | 2 | IF12 | 201 | B |
| | | | 3 | IF12 | 202 | C |

VIRTUAL NETWORK/MAPPING INFORMATION TABLE

*Fig. 3A*

| T222 | F301 | F302 | F303 | F304 | F305 | F306 |
|---|---|---|---|---|---|---|
| | NETWORK DEVICE | VTEP | VNI | PORT NUMBER | VLAN ID | USER |
| | 20 | VTEP21 | 1 | IF21 | 201 | A |
| | | VTEP22 | 2 | IF22 | 201 | B |
| | | | 3 | IF22 | 202 | C |

VIRTUAL NETWORK/MAPPING INFORMATION TABLE

*Fig. 3B*

| T222 | F301 | F302 | F303 | F304 | F305 | F306 |
|---|---|---|---|---|---|---|
| | NETWORK DEVICE | VTEP | VNI | PORT NUMBER | VLAN ID | USER |
| | 30 | VTEP32 | 2 | IF32 | 201 | B |
| | | | 3 | IF32 | 202 | C |

VIRTUAL NETWORK/MAPPING INFORMATION TABLE

*Fig. 3C*

| T224 NETWORK DEVICE | F401 VTEP | F402 TUNNEL COMMUNICATION ROUTE | F403 SOURCE IP ADDRESS | F404 DESTINATION IP ADDRESS |
|---|---|---|---|---|
| 10 | VTEP11 | 301 | IP-A | IP-C |
|  | VTEP12 | 302 | IP-B | IP-D<br>IP-E |

TUNNEL INFORMATION TABLE

*Fig. 4A*

| T224 NETWORK DEVICE | F401 VTEP | F402 TUNNEL COMMUNICATION ROUTE | F403 SOURCE IP ADDRESS | F404 DESTINATION IP ADDRESS |
|---|---|---|---|---|
| 20 | VTEP21 | 301 | IP-C | IP-A |
|  | VTEP22 | 302 | IP-D | IP-B<br>IP-E |

TUNNEL INFORMATION TABLE

*Fig. 4B*

| T224 NETWORK DEVICE | F401 VTEP | F402 TUNNEL COMMUNICATION ROUTE | F403 SOURCE IP ADDRESS | F404 DESTINATION IP ADDRESS |
|---|---|---|---|---|
| 30 | VTEP32 | 302 | IP-E | IP-B<br>IP-D |

TUNNEL INFORMATION TABLE

*Fig. 4C*

| DESTINATION ROUTE | OUTPUT INTERFACE ||
|---|---|---|
| | NEXT HOP ADDRESS | OUTPUT PORT NUMBER |
| IP-A | IP-A | IF23 |
| IP-B | IP-B | IF24 |
| IP-C | TO OWN DEVICE ||
| IP-D | TO OWN DEVICE ||
| IP-E | IP-E | IF24 |

ROUTING TABLE

*Fig. 5*

| VNI | MAC ADDRESS | OUTPUT INTERFACE |||
|---|---|---|---|---|
| | | NETWORK SIDE | ACCESS SIDE ||
| | | VTEP DESTINATION IP ADDRESS | PORT NUMBER | VLAN ID |
| 1 | MAC-A | — | IF11 | 201 |
| 1 | MAC-D | IP-C | — | — |
| 2 | MAC-B | — | IF12 | 201 |
| 2 | MAC-E | IP-D | — | — |
| 3 | MAC-C | — | IF12 | 202 |
| 3 | MAC-F | IP-D | — | — |

MAC ADDRESS TABLE

*Fig. 6*

NETWORK DEVICE THAT RELAYS COMMUNICATION

CLAIM OF PRIORITY

The present application claims priority from Japanese patent application JP 2016-013505 filed on Jan. 27, 2016, the content of which is hereby incorporated by reference into this application.

BACKGROUND OF THE INVENTION

The present invention is related to a network device, a communication method, and a network system.

The background arts include VXLAN (Virtual eXtension Local Area Network) technology for realizing a multi-tenant environment in which the layer 2 of approximately 16 million is disposed on the layer 3 network (see Non-patent Document 1 (IETF RFC7348 "Virtual eXtensible Local Area Network (VXLAN): A Framework for Overlaying Virtualized Layer 2 Networks over Layer 3 Networks," ISSN: 2070-1721, published in August, 2014), for example). In the technology disclosed in Non-patent Document 1, one virtual tunnel end point (VTEP) is provided for a virtual switch or the like in each physical server, and the VTEP encapsulates the layer 2 frame with a layer 3 packet, and the encapsulated packet is sent to a VTEP of the destination terminal.

In the encapsulation process, the VTEP adds a virtual network identifier (VNI: VXLAN Network Identifier) for identifying the tenants to the packet. The VTEP that received the packet performs decapsulation on the packet, identifies the transfer destination based on the destination MAC (Media Access Control) address and the VNI of the layer 2 frame inside of the packet, and transfers the packet. When not knowing the transfer destination, the VTEP discards the decapsulated packet.

The layer 2 VPN (Virtual Private Network) represented by wide area Ethernet (Ethernet is a registered trademark) improves the reliability of network by incorporating the layer 2 redundancy technology. In this network, if a Layer 2 route needs to be changed due to a failure of a physical port or the like, a device that accommodates VPN (end point) changes the layer 2 route by sending a request to other end points so that MAC address entries for the device are cleared and by clearing the entries from MAC address tables of other end points.

SUMMARY OF THE INVENTION

In the network system in which the layer 2 redundancy technology is applied to the VXLAN network of Non-patent Document 1, if a failure of a physical port to be connected to a tenant requires a change in layer 2 route, the VTEP sends out a request to other VTEPs so that MAC address are cleared.

The VTEPs to which the clear request is to be sent are identified by finding the virtual network identifier (VNI) of the VLAN ID that is subjected to the route change, and then identifying VTEPs to which the VNI is assigned.

In the conventional VXLAN, if a plurality of different tenants use the same VLAN ID, one of the tenants needs to change the VLAN ID. If the layer 2 redundancy technology is applied to a network in which the same VLAN ID is assigned to a plurality of different tenants in order to avoid the above-mentioned problem, a VTEP that has the same VLAN ID as the failed VLAN and that does not have a problem would also be identified in the process of identifying the VTEPs to which the clear request is to be sent based on the VLAN ID, and the information of the tenant of the VLAN in which a fail does not occur would also be cleared.

In order to solve the problem, the present invention includes a network device configured to relay communication, wherein the network device has a processor and a memory, wherein the network device communicates with a terminal using a Layer 2 protocol and communicates with another network device via a physical port using a Layer 3 protocol, wherein the network device has a virtual network on which communication with the terminal is conducted, wherein the network device has a virtual tunnel end point that relays the communication on the virtual network to said another network device via the physical port, wherein the memory stores tunnel information that indicates a virtual tunnel end point of the network device and that indicates a virtual tunnel end point of said another network device that communicates with said virtual tunnel end point, wherein the memory stores mapping information that includes a virtual network identifier unique to a combination of the physical port and the virtual network and that includes an identifier of a virtual tunnel end point that relays communication on the virtual network, and wherein the processor is configured to: detect a virtual network that is unable to relay communication as a failed virtual network; identify, as a failed virtual network identifier, a virtual network identifier assigned to a combination of the failed virtual network and a physical port through which communication of the failed virtual network pass, based on the mapping information; identify a first virtual tunnel end point that relays communication of the failed virtual network; identify a second virtual tunnel end point of another network device that communicates with the first virtual tunnel end point based on the tunnel information; and send, to the second virtual tunnel end point, a clear request including the failed virtual network identifier and an IP address of the first virtual tunnel end point, the clear request being used for clearing a MAC address used in the Layer 2 protocol.

In the present invention, a virtual network is identified by a VNI, and therefore, it is possible to appropriately delete the MAC address for the virtual network that has failed. The problems, configurations, and effects other than those described above will become apparent by the descriptions of embodiments below.

BRIEF DESCRIPTIONS OF DRAWINGS

The present invention can be appreciated by the description which follows in conjunction with the following figures, wherein:

FIG. 3A is an explanatory diagram showing an example of a virtual network/mapping information table in the network device of Embodiment 1;

FIG. 3B is an explanatory diagram showing an example of the virtual network/mapping information table in the network device of Embodiment 1;

FIG. 3C is an explanatory diagram showing an example of the virtual network/mapping information table in the network device of Embodiment 1;

FIG. 4A is an explanatory diagram showing an example of a tunnel information table in the network device of Embodiment 1;

FIG. 4B is an explanatory diagram showing an example of the tunnel information table in the network device of Embodiment 1;

FIG. 4C is an explanatory diagram showing an example of the tunnel information table in the network device of Embodiment 1;

FIG. 5 is an explanatory diagram showing an example of a routing information table in the network device of Embodiment 1;

FIG. 6 is an explanatory diagram showing an example of a MAC address table in the network device of Embodiment 1;

DETAILED DESCRIPTION OF THE PREFERRED EMBODIMENTS

Below, the best mode for achieving the present invention is explained below with reference to embodiments in the following order.
Embodiment 1
 A1. System Configuration
 A2. Configuration of Network Device
 A3. Content of Table
 A4. MAC Address Clear Request Sending Processing by Network Device that Detected Failure
 A5. MAC Address Table Clear Processing
 A6. Effects of Embodiment 1
Embodiment 2
 B1. System Configuration
 B2. Configuration of Network Device
 B3. Content of Table
 B4. MAC Address Clear Request Sending Processing by Device that Detected Failure
 B5. MAC Address Table Clear Processing
 B6. Effects of Embodiment 2
Embodiment 3
 C1. System Configuration
 C2. Configuration of Network Device
 C3. Content of Table
 C4. MAC Address Clear Request Sending Processing by Device that Detected Failure
 C5. MAC Address Table Clear Processing
 C6. Effects of Embodiment 3

Embodiment 1

A1. System Configuration

Figure 1:
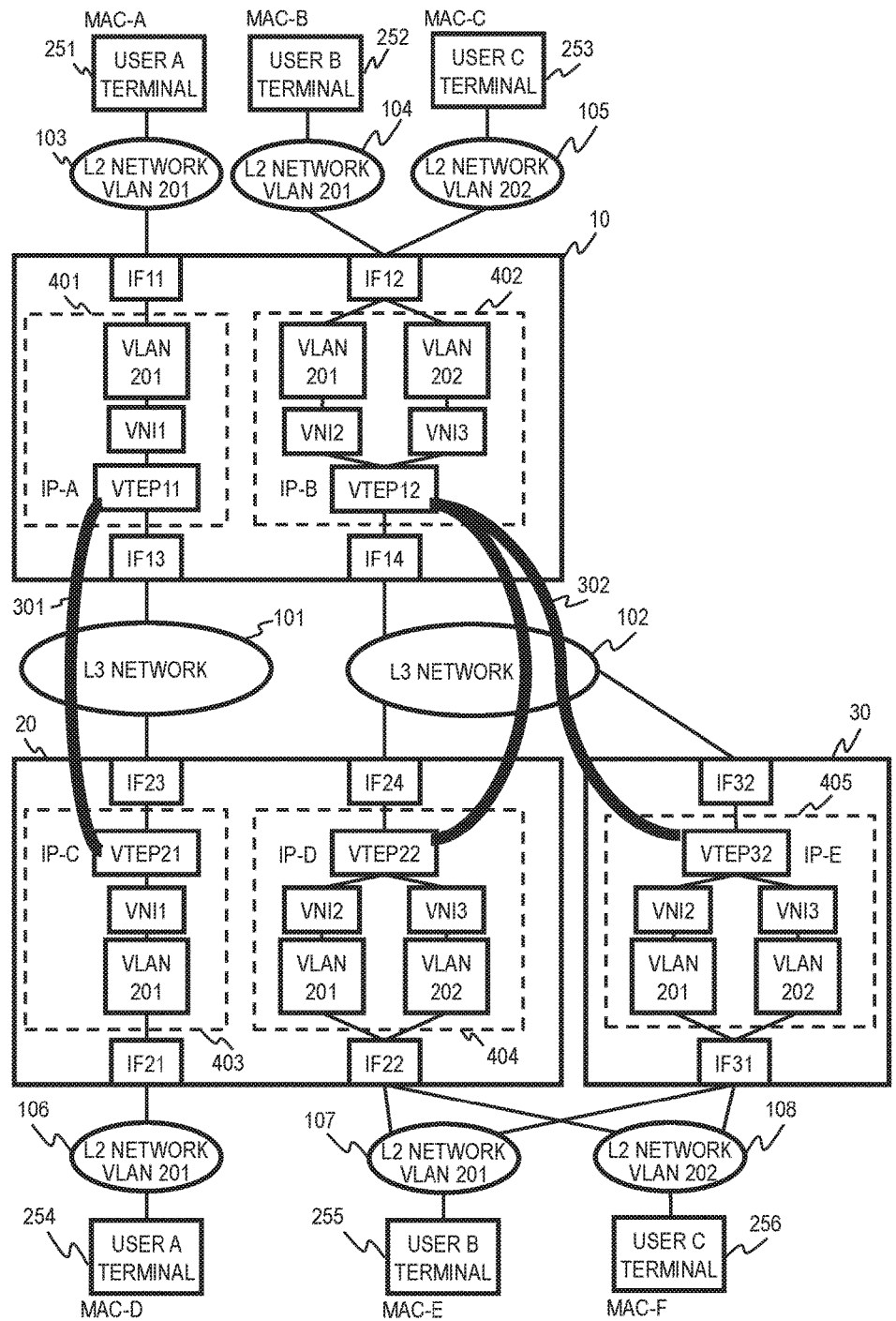
FIG. 1 is an explanatory diagram showing an example of a configuration of a network system of Embodiment 1.

FIG. 1 is an explanatory diagram showing an example of the configuration of a network system of Embodiment 1.

The network system of this embodiment includes a network device 10, a network device 20, and a network device 30. The network device 10, network device 20, and network device 30 are configured to relay communication between terminals. In the descriptions below, only three network devices are provided to relay communication between terminals, but the network system of this embodiment may include two network devices or four or more network devices.

The network device 10 is connected to an L3 network 101 via a physical port "IF13" (physical port whose identifier is "IF13"), and is connected to an L3 network 102 via a physical port "IF14" (physical port whose identifier is "IF14").

The network device 10 is also connected to an L2 network 103 in VLAN "201" (VLAN whose VLAN ID is "201") via a physical port "IF11" (physical port whose identifier is "IF11"). The network device 10 is also connected to an L2 network 104 in VLAN "201" via a physical port "IF12" (physical port whose identifier is "IF12"). The network device 10 is also connected to an L2 network 105 in VLAN "202" (VLAN whose VLAN ID is "202").

The network device 20 is connected to the L3 network 101 via a physical port "IF23" (physical port whose identifier is "IF23"), the L3 network 102 via a physical port "IF24" (physical port whose identifier is "IF24"), and an L2 network 106 in VLAN "201" via a physical port "IF21" (physical port whose identifier is "IF21"). The network device 20 is also connected to an L2 network 107 in VLAN "201" via a physical port "IF22" (physical port whose identifier is "IF22") and to an L2 network 108 in VLAN "202."

The network device 30 is connected to the L3 network 102 via a physical port "IF32" (physical port whose identifier is "IF32"). The network device 30 is also connected to the L2 network 107 in VLAN "201" via a physical port "IF31" (physical port whose identifier is "IF31"), and to the L2 network 108 in VLAN "202" (VLAN whose VLAN ID is "202").

The L2 networks 103 to 108 each relays a packet using a layer 2 protocol. The L3 networks 101 to 102 each relay a packet using a layer 3 protocol.

The network devices 10, 20, and 30 communicate with each other using the layer 3 protocol via the L3 network 101 or the L3 network 102. The network devices 10, 20, and 30 communicate with terminals using the layer 2 protocol via the respective corresponding L2 networks.

The physical ports "IF11," "IF12," "IF21," "IF22," and "IF31" connected to the L2 networks 103 to 108 are hereinafter also referred to as access-side ports. The physical ports "IF13," "IF14," "IF23," "IF24," and "IF32" connected to the L3 networks 101 and 102 are hereinafter also referred to as network-side ports.

In FIG. 1, user A, user B, and user C each are tenants. A tenant means a system including a plurality of terminals that communicate with each other through a virtual network. A tenant is a system owned by a subscriber of a virtual network, for example, and more specifically, a computer system installed at a plurality of locations by one organization.

MAC-A, which is a MAC address, is assigned to a user A terminal 251, and the user A terminal is connected to the L2 network 103. MAC-B, which is a MAC address, is assigned to a user B terminal 252, and the user B terminal 252 is connected to the L2 network 104. MAC-C, which is a MAC address, is assigned to a user C terminal 253, and the user C terminal 253 is connected to the L2 network 105.

MAC-D, which is a MAC address, is assigned to a user A terminal 254, and the user A terminal is connected to the L2 network 106. MAC-E, which is a MAC address, is assigned to a user B terminal 255, and the user B terminal 255 is connected to the L2 network 107. MAC-F, which is a MAC address, is assigned to a user C terminal 256, and the user C terminal 256 is connected to the L2 network 108.

The user A terminal 251 and the user A terminal 254 belong to the same tenant (tenant A). The user B terminal 252 and the user B terminal 255 belong to the same tenant (tenant B). The user C terminal 253 and the user C terminal 256 belong to the same tenant (tenant C).

The network devices 10, 20, and 30 in FIG. 1 achieve communication between the same user terminals (belong to the same tenant; the user A terminal 251 and the user A terminal 254, for example) via the L3 network. The communication via the L3 network means communication using the VXLAN protocol.

IP-A, which is an IP (Internet Protocol) address to connect to the L3 network 101, and IP-B, which is an IP address to connect to the L3 network 102, are assigned to the network device 10.

IP-C, which is an IP address to connect to the L3 network 101, and IP-D, which is an IP address to connect to the L3 network 102, are assigned to the network device 20. IP-E, which is an IP address to connect to the L3 network 102, is assigned to the network device 30.

Each of the network devices 10, 20, and 30 has a virtual network on which communication between the user terminals of the same tenant is conducted. Each of the network devices 10, 20, and 30 has a virtual tunnel end point (VTEP) that relays the communication of the virtual networks (VLAN). Each of the VTEP of this embodiment is set at each of the physical ports, and makes possible the communication using the VXLAN protocol.

VTEP "11" (a VTEP whose identifier is "11") and VTEP "12" are set at the network device 10. IP-A, which is an IP address is assigned to VTEP "11", and IP-B, which is an IP address, is assigned to VTEP "12".

VTEP "21" (a VTEP whose identifier is "21") and VTEP "22" (a VTEP whose identifier is "21") are set at the network device 20. IP-C, which is an IP address, is assigned to VTEP "21", and IP-D, which is an IP address, is assigned to VTEP "22".

VTEP "32" (a VTEP whose identifier is "32") is set at the network device 30, and IP-E, which is an IP address, is assigned to VTEP "32".

In this embodiment, one VTEP is set for one physical port. VTEP "11" is set for the physical port "IF 13," and VTEP "12" is set for the physical port "IF 14." VTEP "21" is set for the physical port "IF 23," and VTEP "22" is set for the physical port "IF 24." VTEP "32" is set for the physical port "IF32."

VTEP "11" and VTEP "21" communicate with each other via a tunnel route 301 that establishes a tunnel connection. The tunnel route 301 has the routing information between the network devices 10 and 20 that use the L3 network 101.

VTEP "12," VTEP "22," and VTEP "32" communicate with each other via a tunnel route 302 that establishes a tunnel connection. The tunnel route 302 retains the routing information between the network devices 10, 20, and 30 that use the L3 network 102.

The network device 10 and the network device 20 respectively contain mapping 401 and mapping 403 shown in FIG. 1 as the VXLAN settings. With these VXLAN settings, the network device 10 and the network device 20 can exchange a layer 2 transfer packet between the user A terminal 251 and the user A terminal 254 via the L3 network 101.

The network device 10 includes the mapping 401. With the mapping 401, VLAN "201" to which the user A terminal 251 belongs is mapped to VNI "1" (VNI (VXLAN Network Identifier) with a value of "1"). VNI "1" is mapped to VTEP "11."

The network device 20 includes the mapping 403. With the mapping 403, VLAN "201" to which the user A terminal 254 belongs is mapped to VNI "1," and VNI "1" is mapped to VTEP "21."

The network devices 10, 20, and 30 respectively include mapping 402, 404, and 405 shown in FIG. 1 as the VXLAN settings. With these VXLAN settings, the network devices 10, 20, and 30 can exchange with each other a layer 2 transfer packet between the user B terminal 252 and the user B terminal 255 via the L3 network 102.

The network device 10 includes the mapping 402. With the mapping 402, VLAN "201" to which the user B terminal 252 belongs is mapped to VNI "2" (VNI (VXLAN Network Identifier) with a value of "2"), and VNI "2" is mapped to VTEP "12."

The network device 20 includes the mapping 404. With the mapping 404, VLAN "201" to which the user B terminal 255 belongs is mapped to VNI "2," and VNI "2" is mapped to VTEP "22."

The network device 30 includes the mapping 405. With the mapping 405, VLAN "201" to which the user B terminal 255 belongs is mapped to VNI "2," and VNI "2" is mapped to VTEP "32."

The network devices 10, 20, and 30 respectively include the mapping 402, 404, and 405 shown in FIG. 1 as the VXLAN settings. With these VXLAN settings, the network devices 10, 20, and 30 can exchange with each other a layer 2 transfer packet between the user C terminal 253 and the user C terminal 256 via the L3 network 102.

With the mapping 402, VLAN "202" to which the user C terminal 253 belongs is mapped to VNI "3" (VNI (VXLAN Network Identifier) with a value of "3"), and VNI "3" is mapped to VTEP "12."

With the mapping 404, VLAN "202" to which the user C terminal 256 belongs is mapped to VNI "3," and VNI "3" is mapped to VTEP "22."

With the mapping 405, VLAN "202" to which the user C terminal 256 belongs is mapped to VNI "3," and VNI "3" is mapped to VTEP "32."

The network devices 10, 20, and 30 encapsulate, with the layer 3 packet in accordance with the VXLAN protocol, the layer 2 frame, which was received from the L2 network and transfer the packet to the L3 network corresponding to the L2 network user terminal. After receiving the encapsulated packet via the L3 network, the network devices 10, 20, and 30 decapsulate the packet and transfer the packet to the corresponding L2 layer connected to each network device.

The user A and user B are different users (tenants), but each of them uses the same VLAN ID "201" in one network device (10 and 20). There are cases as described above where different users use the same VLAN ID in different virtual networks in the same network device instead of using a different VLAN ID. To address this situation, in this embodiment, a VXLAN network identifier (VNI) is assigned to a combination of a physical port and a VLAN ID.

For example, the user A terminal 254 communicates with the physical port "IF 21" of the network device 20 via the L2 layer 106. The user B terminal 255 communicates with the physical port "IF 22" of the network device 20 via the L2 layer 107.

Thus, VNI "1" is assigned to VLAN "201" that relays a packet that passes through the physical ports "IF 21" and "IF 23" is assigned. VNI "2" is assigned to VLAN "201" that relays a packet that passes through the physical ports "IF 22" and "IF 24", and VNI "3" is assigned to VLAN "202" that relays a packet that passes through the physical ports "IF 22" and "IF 24".

By assigning different VNIs within one network device, VLAN "201" of the user A and VLAN "201" of the user B cannot communicate with each other.

One VNI is assigned to one tenant. Thus, among a plurality of VLANs "201" in the network device 10, VNI "1" is assigned to the VLAN that belongs to VTEP "11" connected to the VTEP "21", as in the network device 20.

Among a plurality of VLANs "201" in the network device 10, the VNI "2" is assigned to the VLAN that belongs to VTEP "12" connected to VTEP "22", as in the network device 20.

As described above, in this embodiment, each user (tenant) has a different VNI, and therefore, by using the VNI, even if the same VLAN ID is used for different users in one network device, it is possible to prevent communication between VLANs of different users.

A2. Configuration of Network Device

Figure 2:
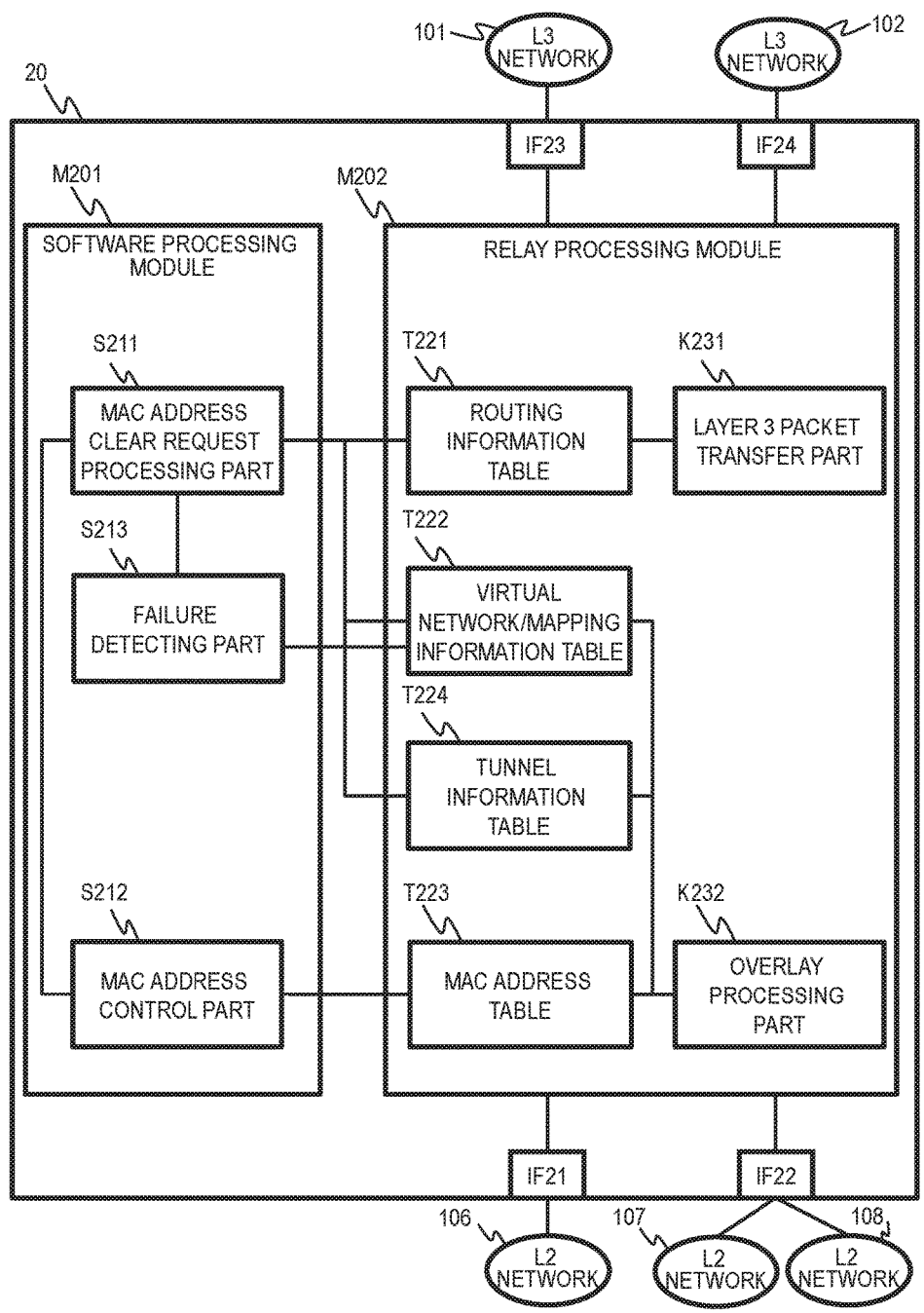
FIG. 2 is an explanatory diagram showing an example of a configuration of a network device of Embodiment 1.

FIG. 2 is an explanatory diagram showing an example of the configuration of the network device 20 of Embodiment 1.

The network devices 10 and 30 of this embodiment have the same configuration as the network device 20. The configuration is explained below with reference to FIG. 2 using the network device 20.

The network device 20 includes modules configured to conduct control and relay packets in accordance with the VXLAN protocol and includes physical ports for connecting to the L2 network and the L3 network.

The network device 20 shown in FIG. 2 includes a software processing module M201, a relay processing module M202, and physical ports "IF21," "IF22," "IF23," and "IF24" for packet transfer.

The software processing module M201 includes a MAC address clear request processing part S211, a MAC address control part S212, and a failure detecting part S213. The software processing module M201 has a processor and a memory for the software processing. The software processing module M201 is connected to the relay processing module M202 and configures and updates information in the relay processing module M202.

The relay processing module M202 has circuits for a layer 3 packet transfer part K231 and an overlay processing part 232. The circuits of the relay processing module M202 may have a processor and a memory.

The layer 3 packet transfer part K231 and the overlay processing part K232 conduct the packet transfer processing. The relay processing module M202 has a memory that includes a virtual network/mapping information table T222, a MAC address table T223, a tunnel information table T224, and a routing information table T221. Each table of the relay processing module M202 contains information used to conduct the packet transfer processing.

The relay processing module M202 is connected to the physical ports "IF21," "IF22," "IF23," and "IF24." The memory in the network device 20 may be a volatile memory and a non-volatile memory. The network device 20 may have an auxiliary storage device, such as a magnetic storage device.

The virtual network/mapping information table T222 maps a virtual tunnel end point (VTEP) to a VNI, and maps a VNI to a combination of the port number for a physical port and a VLAN ID. The physical port is a virtual access interface.

Specifically, the virtual network/mapping information table T222 in the network device 10 includes information that indicates the mapping 401 and mapping 402 shown in FIG. 1. The virtual network/mapping information table T222 in the network device 20 includes information that indicates the mapping 403 and mapping 404 shown in FIG. 1. The virtual network/mapping information table T222 in the network device 30 includes information that indicates the mapping 405 shown in FIG. 1.

The tunnel information table T224 contains a correspondence relationship between a tunnel route set in the L3 network in each VTEP and a tunnel route from a source IP address to a destination IP address. That is, the tunnel information table T224 contains information regarding VTEPs that transfer a packet to the L3 network 101 and the L3 network 102.

The routing information table T221 contains information that shows an output interface for each destination. The information regarding an output interface includes a Next Hop address and an output port number.

The MAC address table T223 contains a correspondence relationship between a MAC address and an output interface for each VNI.

The overlay processing part K232 is a circuit configured to encapsulate, with a layer 3 packet, a layer 2 frame received from an L2 network on the access side and decapsulate a layer 3 packet received from an L3 layer on the network side.

The layer 3 packet transfer part K231 determines the transfer destination of a layer 3 packet by referring to the routing information table T221 and transfers a packet to the L3 network 101 or the L3 network 102.

A3. Content of Table

The content of each table is explained below.

FIGS. 3A to 3C are diagrams for explaining the virtual network/mapping information table T222 of Embodiment 1.

The virtual network/mapping information table T222 includes information such as Network Device F301, VTEP F302, VNI F303, Port Number F304, VLAN ID F305, and User (Tenant) F306. The virtual network/mapping information table T222 contains different pieces of information depending on the network device (10, 20, or 30) that stores the table.

FIG. 3A is an explanatory diagram showing an example of the virtual network/mapping information table T222 in the network device 10 of Embodiment 1. FIG. 3B is an explanatory diagram showing an example of the virtual network/mapping information table T222 in the network device 20 of Embodiment 1. FIG. 3C is an explanatory diagram showing an example of the virtual network/mapping information table T222 in the network device 30 of Embodiment 1.

Network Device F301 indicates a network device in which the virtual network/mapping information table T222 is stored. VTEP F302 indicates an identifier for a virtual tunnel end point (VTEP) of the network device indicated by Network Device F301. VTEP F302 also indicates a VTEP that relays communication by the VLAN indicated by VLAN ID F305.

VNI F303 indicates a VXLAN Network Identifier (VNI). A specific value of VNI F303 is assigned to each combination of Port Number F304 and VLAN ID F 305.

Port Number F304 indicates an identifier for a physical port. The physical port indicated by Port Number F304 is a virtual access interface. VLAN ID F305 indicates an identifier for a VLAN. User F306 indicates an identifier for a user (tenant).

The virtual network/mapping information table T222 contains the values of VNI F303, Port Number F304, and VLAN ID F305 for each of the users indicated by User F306.

In the description of this embodiment, the same VNI is assigned to the same user (tenant) across the network devices, and the same VLAN ID is assigned to the same user (tenant) across the network devices. As for the VNI, a different identifier is assigned to each user, but as for the VLAN ID, the same value may be assigned to a plurality of users.

A VNI needs to be assigned so that the network device can identify a user using the VNI. Thus, the network device may be configured to include a list showing a corresponding relationship between users and VNIs in the respective network devices so that a user can be identified based on the list and a VNI.

The combinations of VNI F303, Port Number F304, and VLAN ID F305 stored in the virtual network/mapping information table T222 correspond to the mapping 401, 402, 403, 404, and 405 shown in FIG. 1.

The overlay processing part K232 refers to the virtual network/mapping information table T222 in the process of outputting an encapsulated packet to a virtual access interface (such as the physical port "IF24") and in the process of outputting an decapsulated packet to a virtual access interface (such as the physical port "IF22").

FIGS. 4A to 4C are diagrams for explaining the tunnel information table T224 of Embodiment 1.

The tunnel information table T224 includes information such as Network Device F401, VTEP F402, Tunnel Route F403, Source IP Address F404, and Destination IP Address F405. The tunnel information table T224 contains different pieces of information depending on the network device (10, 20, or 30) that stores the table.

FIG. 4A is an explanatory diagram showing an example of the tunnel information table T224 in the network device 10 of Embodiment 1. FIG. 4B is an explanatory diagram showing an example of the tunnel information table T224 in the network device 20 of Embodiment 1. FIG. 4C is an explanatory diagram showing an example of the tunnel information table T224 in the network device 30 of Embodiment 1.

Network Device F401 indicates a network device in which the tunnel information table T224 is stored. VTEP F402 indicates an identifier for a VTEP of the network device indicated by Network Device F401. Tunnel Route F403 indicates a tunnel route through which the packet belonging to the VTEP indicated by VTEP F402 travels.

Source IP Address F404 indicates an IP address assigned to the VTEP indicated by VTEP F402. Destination IP Address F405 indicates a destination IP address of a packet output toward the L3 network from the VTEP indicated by VTEP F402.

The tunnel information table T224 contains an identifier of each VTEP connected to the L3 network 101 and the L3 network 102 in VTEP F402. The tunnel information table T224 contains Tunnel Route F403 connected to each VTEP as the information regarding VTEP and also contains Source IP Address F404 and Destination IP Address F405, which are used in the encapsulation processing, for each tunnel route.

The tunnel information table T224 is referred to by the overlay processing part K232 to conduct the encapsulation processing and the decapsulation processing.

FIG. 5 is an explanatory diagram showing an example of the routing information table T221 in the network device 20 of Embodiment 1.

The routing information table T221 includes Destination Route F501 and Output Interface F502. Output Interface F502 includes Next Hop Address F503 and Output Port Number F504. The routing information table T221 contains different pieces of information depending on the network device (10, 20, or 30) that stores the table.

Destination Route F501 indicates an IP address of the destination of a packet. The Next Hop Address F503 indicates an IP address of a device that a packet goes through on its way to the destination indicated by Destination Route F501. Output Port Number F504 indicates an identifier of the physical port of the network device that outputs a packet when the packet is sent to the destination indicated by Destination Route F501.

If Destination Route F501 indicates an IP address of the VTEP of the network device that contains this routing information table T221 (own device), Output Interface F502 indicates the own device.

The routing information table T221 is referred to by the layer 3 packet transfer part K231 in the process of routing search.

FIG. 6 is an explanatory diagram showing an example of the MAC address table T223 in the network device 10 of Embodiment 1.

The MAC address table T223 includes VNI F601, MAC Address F602, and Output Interface F603. Output Interface F603 includes Network Side F604 and Access Side F605. The MAC address information table T223 contains different pieces of information depending on the network device (10, 20, or 30) that stores the table.

The MAC address table T223 is to contain information on an output interface of MAC addresses that has been learned for each VNI which is a VXLAN Network Identifier. The MAC address table T223 associates VNI F601, MAC address F602, and Output Interface F603 with each other.

MAC Address F602 indicates MAC addresses of terminals of the users that communicate with each other via each network device. The network device communicates with the terminal using the MAC address indicated in MAC Address F602. Output Interface F603 includes the output interface on Network Side F604 (identifier of the VTEP of another network device) and includes the output interface on Access Side F605 (identifiers for the physical port and VLAN of the own network).

Network Side F604 indicates an IP address of a destination VTEP when a packet is encapsulated and output toward the L3 network. The VTEP indicated by Network Side F604 is a VTEP on which communication by the terminal indicated by MAC Address F602 is conducted and is a VTEP of another network device. Access Side F605 indicates the port number of the physical port through which the layer 2 frame is output toward the terminal, and the VLAN ID of a VLAN on which communication by the terminal is conducted.

The MAC address table T223 is updated when the overlay processing part K232 learns addresses included in a frame when the frame is sent and received. The MAC address table T223 is referred to by the overlay processing part K232 to conduct the encapsulation processing and decapsulation processing. The overlay processing part K232 registers the learned MAC addresses in the MAC address table T223.

A4. MAC Address Clear Request Sending Processing by Network Device that Detected Failure Below, a case in which a failure of VLAN is detected by the network device 20 is explained as an example.

Figure 7:
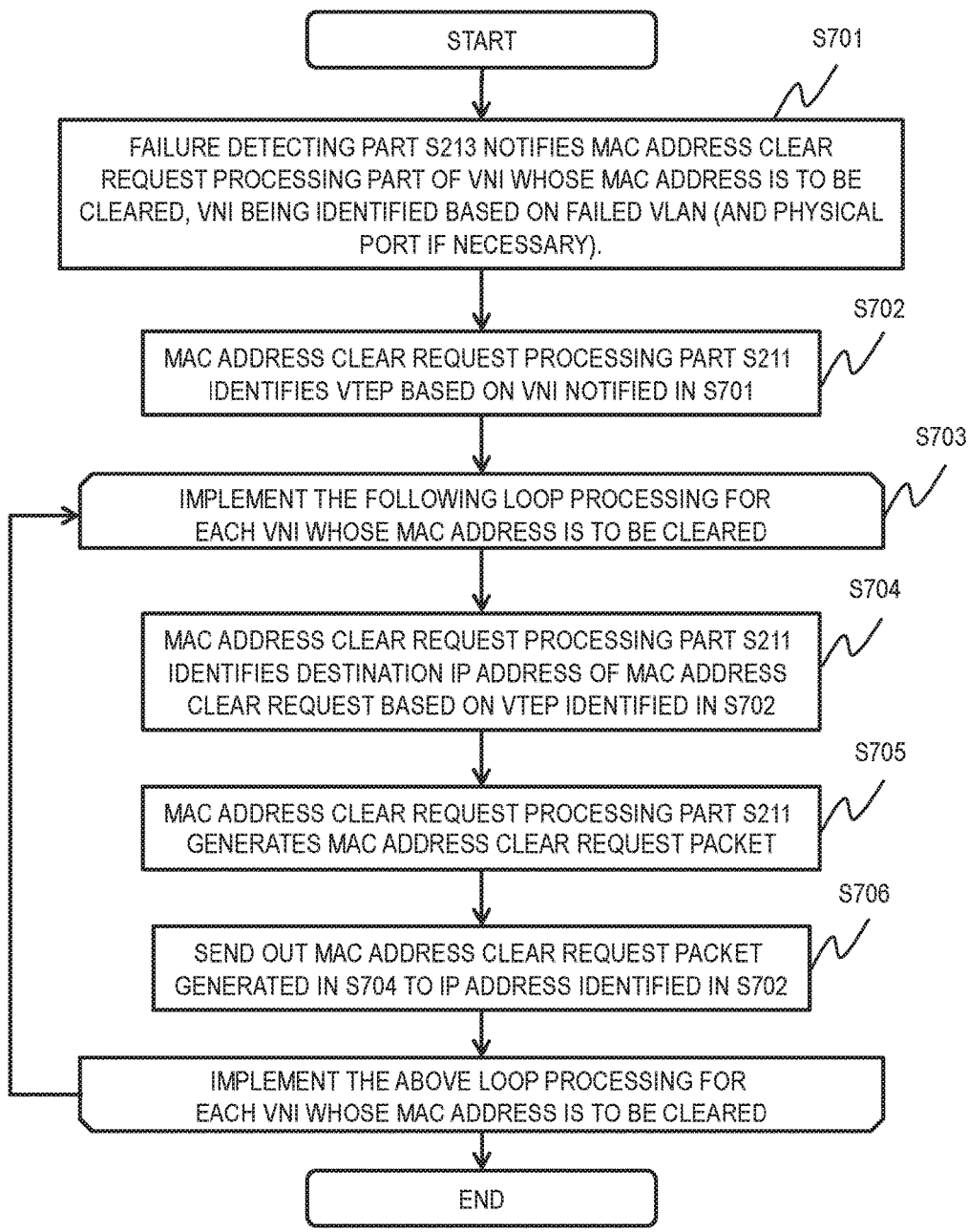
FIG. 7 is a flowchart showing an example of a MAC address clear request sending processing which is conducted by a software processing module of Embodiment 1 when a failure is detected.

FIG. 7 is a flowchart showing an example of the MAC address clear request sending processing which is conducted by the software processing module M201 of Embodiment 1 when a failure is detected.

The MAC address clear request sending processing shown in FIG. 7 is conducted by the software processing module M201 of each of the network devices 10, 20, and 30, and the processing starts when the failure detecting part S213 detects a failure.

When the failure detecting part S213 detects at least one failed VLAN that cannot relay communication in the own network device (hereinafter referred to as the network device 20), the failure detecting part S213 identifies the VLAN that cannot relay communication as a failed virtual network and notifies the MAC address clear request processing part S211 of the VNI whose MAC address is to be cleared (S701).

If a physical port fails, for example, the failure detecting part S213 may identify the VLAN that was relaying communication via the failed physical port as the failed VLAN (failed virtual network). Then the failure detecting part S213 identifies the VNI of the detected VLAN as a VNI whose MAC address is to be cleared.

If the VLAN has become unable to relay communication due to improper modification of the configuration of the VLAN, for example, the failure detecting part S213 may determine that the VLAN has failed and identify the VNI of the failed VLAN.

In some cases, the same VLAN ID as the ID of the failed VLAN is used for a different user from the user that uses the failed VLAN within one network device. In this case, the failure detecting part S213 detects a physical port that contains the failed VLAN, and then identifies the VNI of the VLAN based on a combination of the detected physical port and VLAN in Step S701.

The failure detecting part S213 may employ any method to obtain the combination of the failed VLAN and a physical port that the packet would go through after going through the VLAN.

For example, the failure detecting part S213 may read out a combination of the failed VLAN and a physical port that accommodates the failed VLAN from event information output by the failure detection function of the network device.

In Step S701, the failure detecting part S213 refers to the virtual network/mapping information table T222 to find a combination of VLAN ID F305 and Port Number F304 that matches the combination of the failed VLAN and a physical port that accommodates the VLAN. The failure detecting part S213 then identifies VNI F303 indicated by the combination. This VNI F303 is a VNI whose MAC address is to be cleared.

If a failure is detected in a plurality of VLANs, the failure detecting part S213 identifies a plurality of VNIs as VNIs whose MAC addresses are to be cleared and notifies the MAC address clear request processing part S211 of the VNIs in Step S701.

After receiving the VNI whose MAC address is to be cleared from the failure detecting part S213, the MAC address clear request processing part S211 refers to the virtual network/mapping information table T222 and identifies a VTEP that accommodates the VLAN to be subjected to the MAC address clearing processing (corresponding to VTEP F302) based on the notified VNI (corresponding to VNI F303) (S702).

If there are a plurality of VNIs notified from the failure detecting part S213 in Step S701, the MAC address clear request processing part S211 identifies a VTEP for each VNI, and then repeats the processing of Step S704 to S706 (S703).

The MAC address clear request processing part S211 refers to the tunnel information table T224, selects an entry in which VTEP F402 includes the VTEP identified in Step S702, and identifies a destination IP address (Destination IP Address F405) included in the selected entry (S704).

The identified destination IP address is the destination of the MAC address clear request and is the IP address of a VTEP connected to the VTEP that accommodates VLAN whose MAC address is to be cleared.

Figure 8:
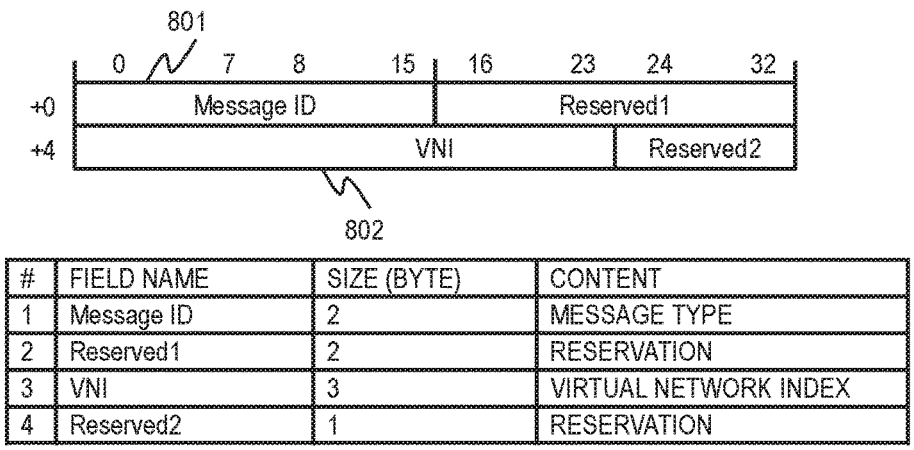
FIG. 8 is an explanatory diagram showing an example of a part of a packet format of a MAC address clear request packet of Embodiment 1.

FIG. 8 is an explanatory diagram showing an example of a part of the packet format of the MAC address clear request packet of Embodiment 1.

The packet format shown in FIG. 8 is a part of the MAC address clear request and is stored in a data part (or payload part) of the MAC address clear request packet, for example. The MAC address clear request packet includes a header part that stores the destination IP address and the like, in addition to the packet format shown in FIG. 8.

The packet format shown in FIG. 8 includes Message ID 801 and VNI 802. Message ID 801 indicates that the packet is a MAC address clear request packet. VNI 802 indicates a VNI of the failed VLAN.

After Step S704, the MAC address clear request processing part S211 generates, in accordance with the packet format shown in FIG. 8, a MAC address clear request packet in which the VNI notified in Step S701 is stored in VNI 802 and Message ID 801 indicates a MAC address clear request (S705).

The MAC address clear request processing part S211 of Embodiment 1 generates a MAC address clear request packet for a VNI of each VLAN that has failed. With this configuration, even if a plurality of VLANs have failed, by generating a MAC address clear request packet for each of the failed VLANs, this embodiment can be implemented with simple processing.

After Step S705, the MAC address clear request processing part S211 sends the MAC address clear request packet generated in Step S705 toward the destination IP address identified in Step S704.

More specifically, the MAC address clear request processing part S211 sends the identified destination IP address and the MAC address clear request packet to the relay processing module M202. In this process, the MAC address clear request processing part S211 may notify the relay processing module M202 of the port number of a physical port that accommodates the failed VLAN (Port Number F304), a VTEP of the failed VLAN, or the like, so that the relay processing module M202 can output the MAC address clear request packet from the physical port that accommodates the failed VLAN.

The overlay processing part K232 of the relay processing module M202 refers to the tunnel information table T224 and encapsulates the MAC address clear request packet. Specifically, the overlay processing part K232 encapsulates the MAC address clear request packet by adding the IP address assigned to the VTEP of the failed VLAN to the MAC address clear request packet as the source IP address and by adding the destination IP address sent from the MAC address clear processing part S211 to the MAC address clear request packet.

Thereafter, the layer 3 packet transfer part K231 of the relay processing module M202 refers to the routing information table T221, and outputs the MAC address clear request packet to the destination IP address from the physical port that accommodates the failed VLAN (S706).

A5. MAC Address Table Clear Processing

Below, a case in which the network device 10 receives the MAC address clear request is explained as an example.

Figure 9:
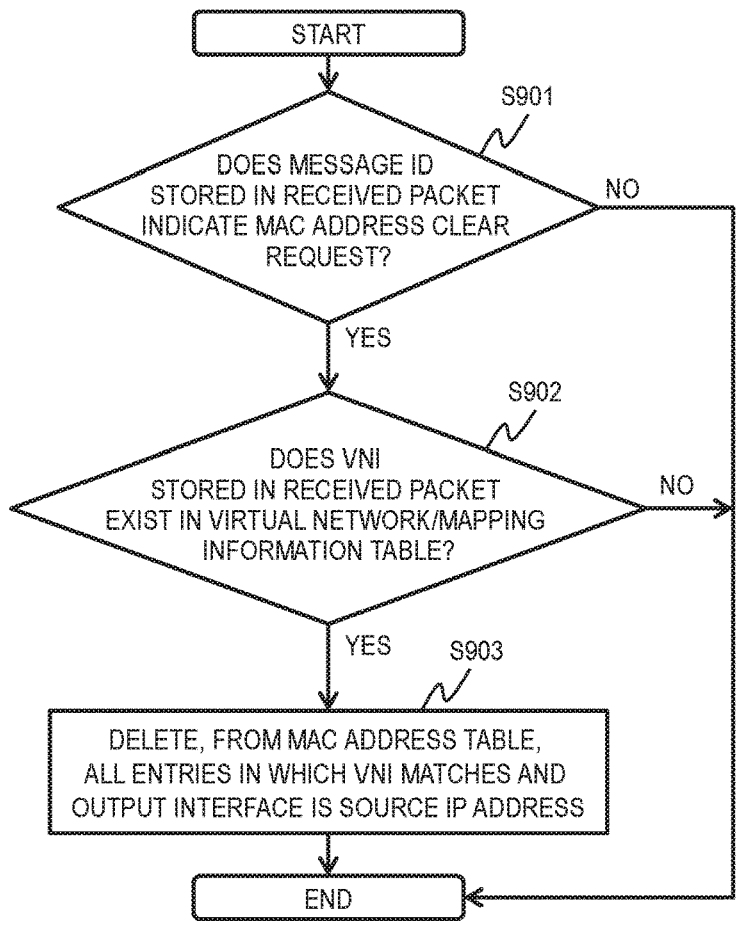
FIG. 9 is a flowchart showing an example of a MAC address table clear processing conducted when the MAC address clear request is received in Embodiment 1.

FIG. 9 is a flowchart showing an example of a MAC address table clear processing conducted when the MAC address clear request is received in Embodiment 1.

The software processing module M201 of each of the network devices 10, 20, and 30 conducts the MAC address table clear processing shown in FIG. 9 after receiving a MAC address clear request from another network device. When a network device receives a packet from another network device, the overlay processing part K232 of the network device decapsulates the packet.

After receiving a packet, the MAC address clear request processing part S211 determines whether Message ID 801 of the packet indicates a MAC address clear request packet or not (S901). If Message ID 801 does not indicate a MAC address clear request packet, the MAC address clear request processing part S211 ends the processing shown in FIG. 9.

If Message ID 801 of the received packet indicates a MAC address clear request packet, the MAC address clear request processing part S211 refers to the virtual network/ mapping information table T222. Thereafter, the MAC address clear request processing part S211 determines whether VNI F303 includes the VNI indicated by VNI 802 of the MAC address clear request packet (S902).

If the VNI of the MAC address clear request packet is not included in VNI F303, it is not necessary for the MAC address clear request processing part S211 to clear a MAC address. Thus, the MAC address clear request processing part S211 ends the processing shown in FIG. 9.

If the VNI of the MAC address clear request packet is included in VNI F303, the MAC address clear request processing part S211 notifies the MAC address control part S212 of a combination of the VNI of the MAC address clear request packet and the source IP address.

The VNI of the MAC address clear request packet is the value of VNI F601 of an entry to be deleted from the MAC address table T223. The source IP address of the MAC address clear request packet is the destination IP address for the receiver side of the MAC address clear request packet, and corresponds to the output interface of Network Side F604.

Thus, the source IP address of the MAC address clear request packet is the value of the output interface of Network Side F604 of an entry to be deleted from the MAC address table T223.

After receiving the value of VNI F601 and the value of the output interface of Network Side F604, the MAC address control part S212 deletes every entry that corresponds to the combination of VNI F601 and the output interface of Network Side F604 which were notified (S903).

In Step S903, the MAC address control part S212 deletes entries from the MAC address table T223 by deleting, from the MAC address table T223, the MAC address of the terminal that enables communication relayed by the failed VLAN.

Figure 10:
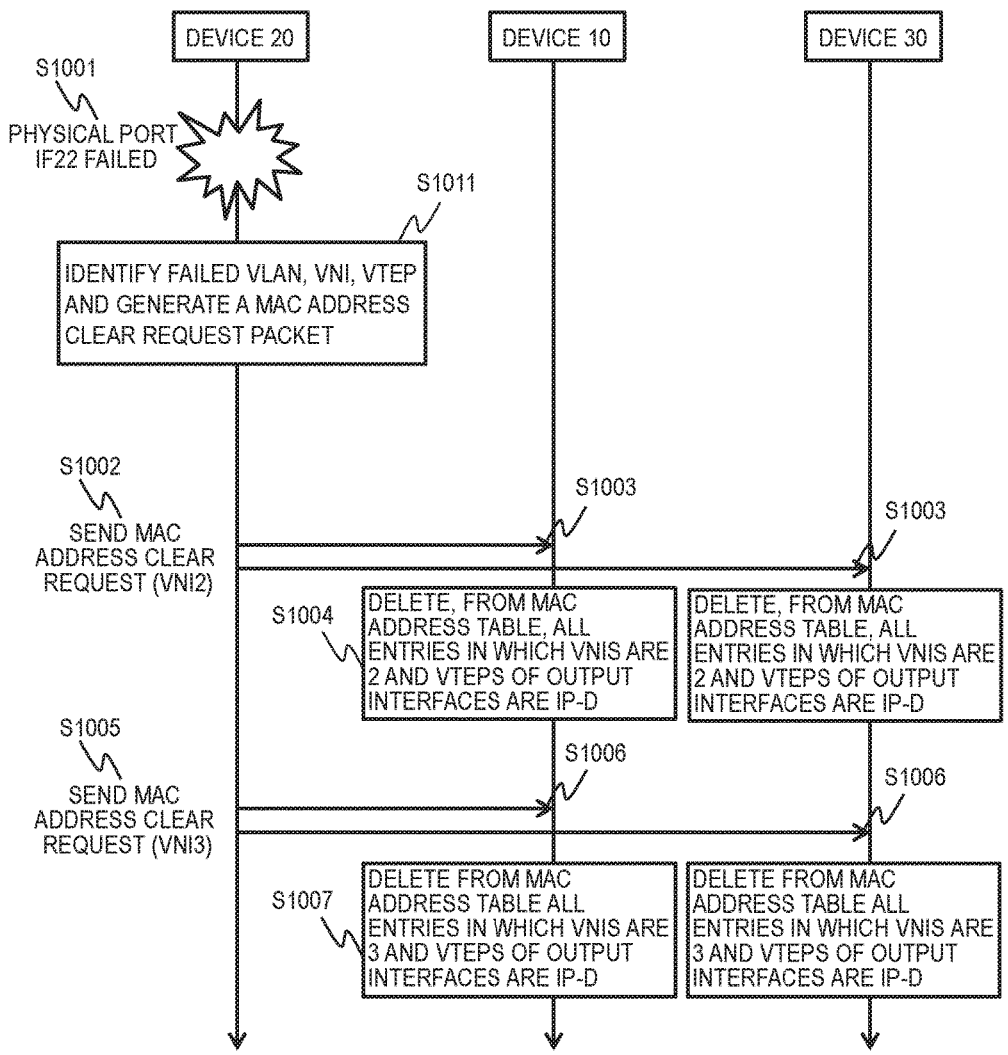
FIG. 10 is a sequence diagram showing an example of processing between the network devices when two VLANs have failed in Embodiment 1.

FIG. 10 is a sequence diagram showing an example of processing between the network devices when two VLANs have failed in Embodiment 1.

FIG. 10 depicts processing when the physical port "IF22" has failed in the network device 20 which causes the VLANs "201" and "202" which are connected to the L2 networks 107 and 108 to be unable to relay communication. The processing flow is explained below with reference to FIGS. 3A to 3C, FIGS. 4A to 4C, FIG. 5, FIG. 6, and FIG. 10.

When the physical port "IF22" is down, the failure detecting part S213 of the network device 20 detects a VLAN that includes the physical port "IF22" as a failed VLAN (S1001).

Upon detection of a failed VLAN, the failure detecting part S213 refers to the virtual network/mapping information table T222 by conducting Step S701 shown in FIG. 7 and identifies the VNI of the failed VLAN.

In FIG. 10, since the physical port "IF22" is down, the failure detecting part S213 detects VLAN "201" and VLAN "202" as the failed VLANs. According to the virtual network/mapping information table T222 shown in FIG. 3B, the failure detecting part S213 identifies an entry in which VLAN ID F305 is "201" and Port Number F304 is "IF22" and an entry in which VLAN ID F305 is "202" and Port Number F304 is "IF22." The failure detecting part S213 and identifies VNIs under VNI F303 of those identified entries, which are "2" and "3" in this case.

The failure detecting part S213 notifies the MAC address clear request processing part S211 of the VNIs "2" and "3" (corresponding to Step S701). After receiving the information, the MAC address clear request processing part S211 refers to the virtual network/mapping information table T222, and identifies a VTEP whose MAC address is to be cleared (Step S702).

According to the virtual network/mapping information table T222 shown in FIG. 3B, the MAC address clear request processing part S211 identifies "22" as an identifier of the VTEP in which the VNIs are respectively "2" and "3."

Then the MAC address clear request processing part S211 of the network device 20 refers to the tunnel information table T224 and identifies a destination IP address of the MAC address clear request (corresponding to Step S704). According to the tunnel information table T224 shown in FIG. 4B, VTEP "22" is connected to a VTEP to which an IP address of IP-B is assigned, and to a VTEP to which an IP address of IP-E is assigned.

Then the MAC address clear request processing part S211 of the network device 20 generates a MAC address clear request packet including VNI "2" (corresponding to Step S705). Step S1011 corresponds to Steps S701, S702, S704, and S705 shown in FIG. 7.

The MAC address clear request processing part S211 of the network device 20 sends out the MAC address clear request packet via the relay processing module M202 and the physical port. According to the routing information table T221 shown in FIG. 5, in the entry with Destination Route F501 being IP-B, Next Hop Address F503 is IP-B and Output Port Number F504 is "IF24." In the entry with Destination Route F501 being IP-E, Next Hop Address F503 is IP-E and Output Port Number F504 is "IF24."

In order to send the MAC address clear request packet to the tunnel connection routes with VNI "2," the MAC address clear request processing part S211 of the network device 20 sends out the MAC address clear request packet to the relay processing module M202.

After the overlay processing part K232 encapsulates the MAC address clear request packet, the layer 3 packet transfer part K231 sends out the MAC address clear request packet from the physical port "IF24" to IP-B and IP-E (S1002). Step S1002 corresponds to Step S706 of FIG. 7.

Since IP-B is assigned to VTEP "12" of the network device 10, VTEP "12" of the network device 10 receives the MAC address clear request packet including VNI "2" from the network device 20 (S1003). Since IP-E is assigned to VTEP "32" of the network device 30, VTEP "32" of the network device 30 receives the MAC address clear request packet including VNI "2" from the network device 20 (S1003).

When receiving the MAC address clear request packet in Step S1003, the MAC address clear request processing part S211 of the network device 10 identifies a VTEP to be subjected to deletion based on the source IP address in the received MAC address clear request packet and identifies the VNI to be subjected to deletion from the VNIs stored in the MAC address clear request packet.

According to FIG. 4A, the source IP address is IP-D. According to the received MAC address clear request, the VNI to be deleted is "2."

The network device 30 that has received the MAC address clear request packet conducts the same processing as the network device 10. Thus, the descriptions of the processing by the network device 30 is omitted.

The MAC address clear request processing part S211 of the network device 10 notifies the MAC address control part S212 of the output interface to be subjected to deletion (the source IP address of the received MAC address clear request packet) and the VNI to be subjected to deletion. In the processing of FIG. 10, the output interface to be subjected to deletion is IP-D (corresponding to the destination IP address of the VTEP of Network Side F604). The VNI to be subjected to deletion is "2" (corresponding to VNI F601).

The MAC address control part S212 of the network device 10 deletes a MAC address from the MAC address table T223 based on the received output interface (Network Side F604) and VNI (VNI F601). The MAC address control part S212 deletes an entry in which MAC address F602 is MAC-E from the MAC address table T223 shown in FIG. 6 (S1004).

Step S1004 corresponds to Steps S901 to 903 shown in FIG. 9. In Step S1003 and Step S1005, the MAC address clear request processing part S211 conducts Step S903 of FIG. 9 on VNI "3."

On the other hand, the MAC address clear request processing part S211 of the network device 20 sends out a MAC address clear request packet to the destination having VNI "3" (S1005). Step S1005 corresponds to Step S706. The processing of Step S1005 is the same as the processing of Step S1002 except that the MAC address clear request processing part S211 stores VNI "3" in the MAC address clear request packet. Since IP-B is assigned to the network device 10, the network device 10 receives the MAC address clear request packet including VNI "3" from the network device 20 (S1006). Since IP-E is assigned to the network device 30, the network device 30 receives the MAC address clear request packet including VNI "3" from the network device 20 (S1006).

After receiving the MAC address clear request packet in Step S1006, the MAC address control part S212 of the network device 10 deletes a corresponding MAC address from the MAC address table T223 in a manner similar to Step S1004 (S1007). Step S1007 is the same as Step S1004 except that the VNI to be deleted is "3" and the MAC address to be deleted is MAC-F.

A6. Effects of Embodiment 1

In the network device of Embodiment 1 described above, a failed VLAN is identified by a VNI, and therefore, even if there are a plurality of users (tenants) using the same VLAN ID, it is possible to prevent a MAC address that does not need to be deleted from being erroneously deleted.

Thus, when the VLAN ID assigned by the user A and the VLAN ID assigned by the user B in FIG. 1 are the same as each other, for example, an administrator of the network devices 10 and 20 can apply this embodiment to the network devices 10 and 20 instead of asking the user A and user B to change the respective VLAN IDs.

Embodiment 2

B1. System Configuration

The system configuration of Embodiment 2 is the same as the system configuration of Embodiment 1 of FIG. 1.

B2. Configuration of Network Device

The configuration of the network devices of Embodiment 2 is the same as the configuration of the network devices of Embodiment 1 shown in FIG. 2.

B3. Content of Table

The content of tables of Embodiment 2 is the same as the content of tables of Embodiment 1 shown in FIGS. 3A to 3C, FIGS. 4A to 4C, FIG. 5, and FIG. 6.

B4. MAC Address Clear Request Sending Processing by Device that Detected Failure FIG. 11 is a flowchart showing an example of the MAC address clear request sending processing which is conducted by the software processing module M201 when a failure is detected in Embodiment 2.

Figure 11:
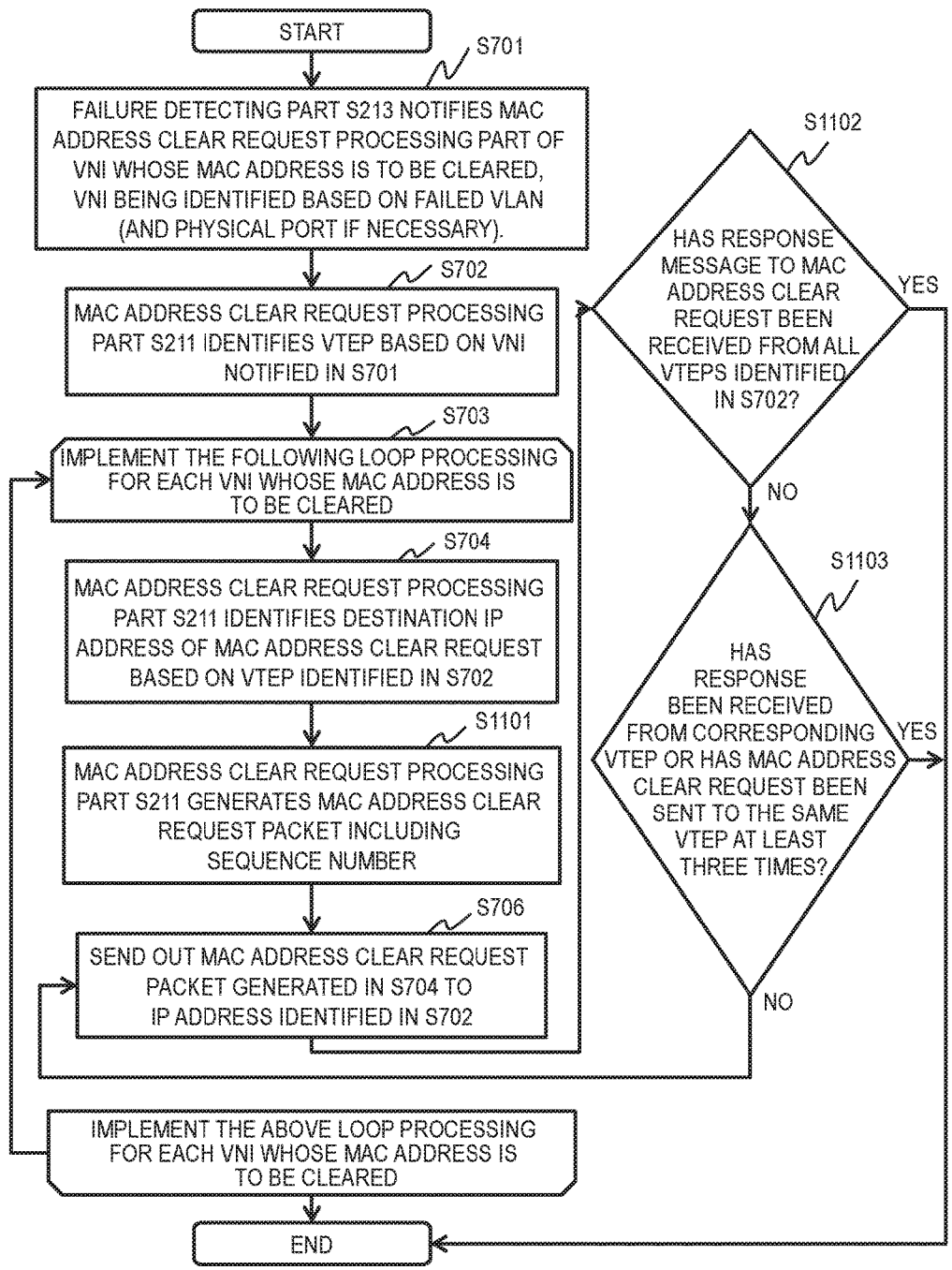
FIG. 11 is a flowchart showing an example of the MAC address clear request sending processing which is conducted by the software processing module when a failure is detected in Embodiment 2.

Steps S701 to S704 and S706 of the processing shown in FIG. 11 are the same as Steps S701 to S704 and S706 of Embodiment 1.

Unlike Embodiment 1, the MAC address clear request sending processing of Embodiment 2 includes processing to send a MAC address clear request packet to one destination multiple times, processing to add a sequence number to the packet format of the MAC address clear request, and processing to wait a response to the MAC address clear request.

In the example of FIG. 11 described below, the MAC address clear request packet is sent three times.

After Step S704, the MAC address clear request processing part S211 of Embodiment 2 generates a MAC address clear request packet (S1101). In this MAC address clear request packet, a sequence number associated to each destination VTEP and VNI notified to the MAC address clear request processing part S211 in Step S701 is stored in the data part (payload part), in accordance with the packet format shown in FIG. 12.

Figure 12:
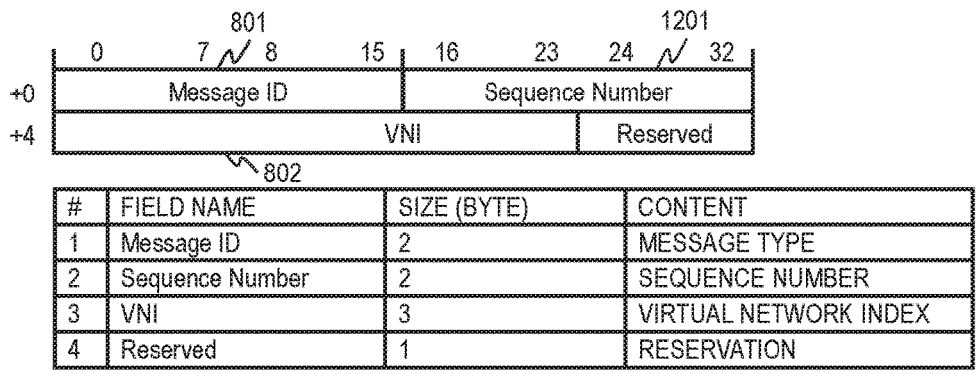
FIG. 12 is an explanatory diagram showing an example of the packet format of the MAC address clear request packet of Embodiment 2.

FIG. 12 is an explanatory diagram showing an example of the packet format of the MAC address clear request packet of Embodiment 2.

In a manner similar to Embodiment 1, the MAC address clear request packet of Embodiment 2 includes Message ID 801 and VNI 802. The MAC address clear request packet of Embodiment 2 also includes Sequence Number 1201 unlike Embodiment 1.

In Sequence Number 1201, a value unique to each destination address of the MAC address clear packet is stored. Any value may be stored in Sequence Number 1201 as long as the value indicates the content of the MAC address clear request packet.

For example, when one VNI is sent by one MAC address clear request packet, and a plurality of MAC address clear request packets are sent to one VTEP, the MAC address clear request processing part S211 may store, in Sequence Number 1201, a unique identifier for the combination of the destination VTEP and VNI.

In a manner similar to Embodiment 1, after Step S1101, the MAC address clear request processing part S211 sends out a MAC address clear request packet in S706. Thereafter, the MAC address clear request processing part S211 waits until a response message to the MAC address clear request has been received from each of the destination VTEPs identified in Step S702. In this description, the MAC address clear request processing part S211 sends out the MAC address clear request packet a predetermined number of times, and then stops sending the packet.

When the network device of Embodiment 2 receives the MAC address clear request packet, the MAC address clear request processing part S211 thereof stores an identifier indicating a MAC address clear request response in Message ID 801 of the received MAC address clear request packet in accordance with the packet format shown in FIG. 12.

Thereafter, the overlay processing part K232 replaces the source IP address with the destination IP address in the MAC address clear request packet, thereby generating a response message. The network device of Embodiment 2 then causes the layer 3 packet transfer part K231 to send out the response message to the sender of the MAC address clear request packet.

The network device of Embodiment 2 sends out the response message after storing, in Sequence Number 1201 of the response message, a value stored in Sequence Number 1201 of the received MAC address clear request packet.

The MAC address clear request processing part S211 looks for a response message to the MAC address clear request, and determines whether or not a response message is received within a predetermined period of time after the MAC address clear request is sent out for the first time (S1102).

If a response message is not received for all of the identified VTEPs, the MAC address clear request processing part S211 determines whether or not a response message from the VTEP that is the destination of the MAC address clear request packet has been received, or whether or not the MAC address clear request packet has been sent to the same VTEP over a predetermined number of times (S1103). In this example, the predetermined number of times is three.

When having received a response message from the destination VTEP or having sent the MAC address clear request packet to the same VTEP at least three times, the MAC address clear request processing part S211 stops sending out the MAC address clear request packet and returns to Step S703.

When the MAC address clear request processing part S211 has received a response message from the destination VTEP and has not sent the MAC address clear request packet to the same VTEP three times yet, there is a chance that the MAC address clear request was lost. Thus, the MAC address clear request processing part S211 returns to Step S706, and sends out the MAC address clear request packet again.

In this process, the MAC address clear request processing part S211 does not update Sequence Number 1201, and instead assigns the same sequence number to the same destination VTEP, and sends out the MAC address clear request packet. By conducting Steps S706, S1102, and S1103, the MAC address clear request processing part S211 resends the MAC address clear request up to three times until a response message to the MAC address clear request is received.

The predetermined period of time in Step S1102 and the predetermined number of times in Step S1103 may be any period of time and any number of times. By resending the MAC address clear request packet, the MAC address clear request processing part S211 can send the MAC address clear request packet to the destination without fail.

B5. MAC Address Table Clear Processing

Figure 13:
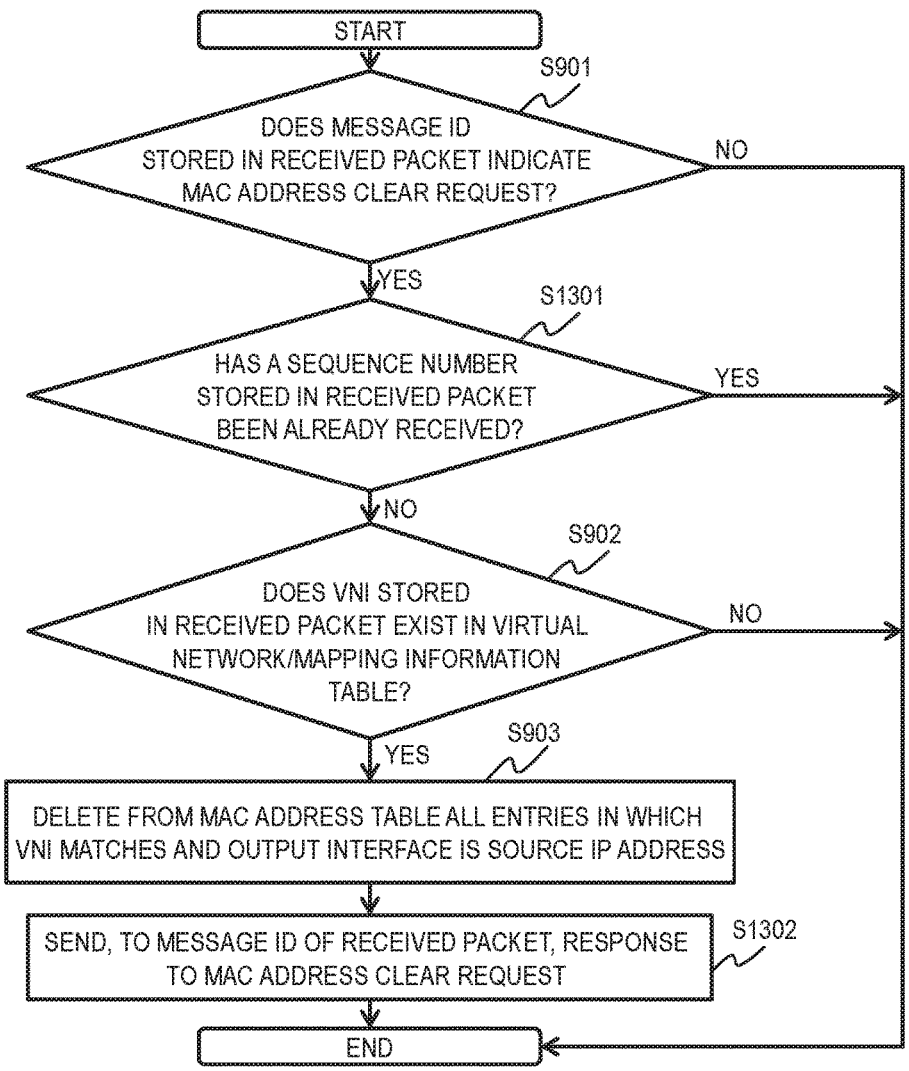
FIG. 13 is a flowchart showing an example of the MAC address table clear processing conducted by the software processing module when the MAC address clear request is received in Embodiment 2.

FIG. 13 is a flowchart showing an example of the MAC address table clear processing conducted by the software processing module M201 when the MAC address clear request is received in Embodiment 2.

The MAC address table clear processing of Embodiment 2 differs from Embodiment 1 in that it includes processing to receive a MAC address clear request packet that includes a sequence number in the packet format thereof, and processing to send out a response to the MAC address clear request.

The processing shown in FIG. 13 includes Steps S901, S902, and S903 shown in FIG. 9 in a manner similar to Embodiment 1. On the other hand, the processing shown in FIG. 13 includes Steps S1301 and S1302 unlike Embodiment 1.

If the MAC address clear request processing part S211 determines that the MAC address clear request packet is received in Step S901, the MAC address clear request processing part S211 determines whether the sender VTEP and the sequence number of the received MAC address clear request packet are the same as those of the previously received MAC address clear request or not (S1301).

If the sender VTEP and the sequence number are the same as those of the previously received MAC address clear request packet, the MAC address has been already cleared, and therefore, the MAC address clear request processing part S211 ends the processing shown in FIG. 13.

If the sender VTEP or the sequence number differs from the sender VTEP or the sequence number of the previously received MAC address clear request packet, this means that this MAC address clear request packet has not been received before, and therefore, the MAC address clear request processing part S211 conducts Step S902.

After deleting the entry from the MAC address table T223 in Step S903, the MAC address clear request processing part S211 updates Message ID 801 of the received MAC address clear request packet to a value that indicates a response to the MAC address clear request. The relay processing module M202 then generates a response message by updating the destination and sender addresses. The relay processing module M202 sends out the response message to the sender of the MAC address clear request packet (S1302).

Figure 14:
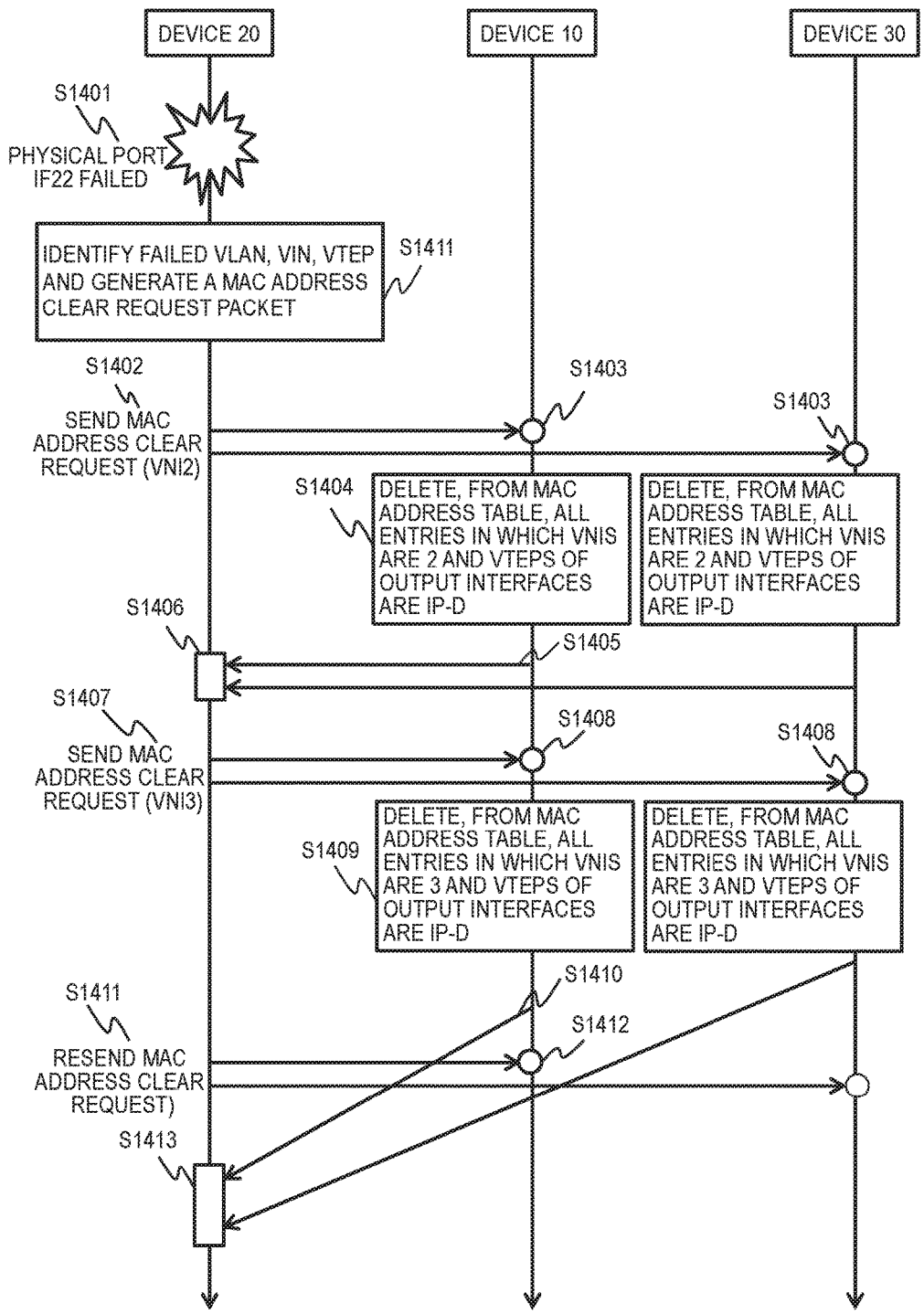
FIG. 14 is a sequence diagram showing an example of processing in a case in which a physical port fails in the network device in Embodiment 2.

FIG. 14 is a sequence diagram showing an example of processing in a case in which a physical port fails in the network device 20 in Embodiment 2.

In a manner similar to FIG. 10, FIG. 14 depicts processing conducted when the physical port "IF22" fails in the network device 20 and VLAN "201" and "202," which are connected to the L2 network 107 and L2 network 108, are therefore unable to relay communication. The processing flow of FIG. 14 is explained below with reference to FIGS. 3A to 3C, FIGS. 4A to 4C, FIG. 5, FIG. 6, and FIG. 10.

In a manner similar to Step S1001 of FIG. 10, the failure detecting part S213 of the network device 20 detects a failure of a VLAN caused by the failed physical port "IF22." The failure detecting part S213 then notifies the MAC address clear request processing part S211 of failed VNIs which are "2" and "3" (corresponding to Step S701).

After receiving the VNI information, the MAC address clear request processing part S211 refers to the virtual network/mapping information table T222 and identifies a VTEP whose MAC address is to be cleared (corresponding to Step S702). According to the virtual network/mapping information table T222 shown in FIG. 3B, the MAC address clear request processing part S211 identifies VTEP "22" to which VNI "2" and "3" are assigned.

Then the MAC address clear request processing part S211 of the network device 20 refers to the tunnel information table T224, and identifies a destination IP address of the MAC address clear request (corresponding to Step S704). According to the tunnel information table T224 of FIG. 4B, the IP addresses of the VTEP to which VTEP "22" is connected are IP-B and IP-E.

Thereafter, the MAC address clear request processing part S211 of the network device 20 generates a MAC address clear request packet that includes VNIs identified in Step S701, the destination IP addresses identified in Step S704, and the sequence number assigned to the VTEP identified in Step S702 (corresponding to Step S1101).

Step S1411 corresponds to Steps S701 to S704 and S1101 shown in FIG. 11.

The MAC address clear request processing part S211 of the network device 20 sends out the generated MAC address clear request packet via the relay processing module M202 and the physical port. According to the routing information table T221 shown in FIG. 5, in the entry in which Destination Route F501 is IP-B, Next Hop Address F503 is IP-B and Output Port Number F504 is "IF24." In the entry in which Destination Route F501 is IP-E, Next Hop Address F503 is IP-E and Output Port Number F504 is "IF24."

The sequence number "1" is assigned to the IP address IP-B. The sequence number "3" is assigned to the IP address IP-E.

The layer 3 packet transfer part K231 sends out the MAC address clear request packet from the physical port "IF24" (S1402).

Since IP-B is assigned to VTEP "12" of the network device 10, VTEP "12" of the network device 10 receives the MAC address clear request packet including VNI "2" from the network device 20. Since IP-E is assigned to VTEP "32" of the network device 30, VTEP "32" of the network device 30 receives the MAC address clear request packet including VNI "2" from the network device 20 (S1403).

After receiving the MAC address clear request packet in Step S1403, the MAC address clear request processing part S211 of the network device 10 conducts Steps S901, S1301, and S902 and then identifies a VTEP to be subjected to deletion based on the source IP address in the received MAC address clear request packet, and identifies a VNI to be subjected to deletion from the VNI stored in the MAC address clear request packet.

According to the tunnel information table T224 shown in FIG. 4A, the MAC address clear request processing part S211 identifies VTEP F402 of an entry in which Destination IP Address F405 is IP-D, which is VTEP "12." Also, according to the received MAC address clear request, VNI to be deleted is "2."

The network device 30 that has received the MAC address clear request packet conducts the same processing as the network device 10. Thus, the descriptions of the processing by the network device 30 is omitted.

The MAC address clear request processing part S211 of the network device 10 notifies the MAC address control part S212 of the output interface and the VNI to be deleted. In the example shown in FIG. 14, in the VTEP to be deleted, Network Side F604 of the output interface is IP-D, and VNI F601 is "2."

The MAC address control part S212 of the network device 10 deletes the specified MAC address from the MAC address table T223. Specifically, the MAC address control part S212 deletes entries in which MAC address F602 is MAC-E from the MAC address table T223 shown in FIG. 6 (S1404). Step S1404 corresponds to Steps S901, S1301, S902, and S903 shown in FIG. 13.

The MAC address clear request processing part S211 of the network device 10 sends out a response message for the MAC address clear request to the network device 20, which is the sender of the request (S1405). Step S1405 corresponds to Step S1302 of FIG. 13.

After receiving a response message for the MAC address table clear request, the MAC address clear request processing part S211 of the network device 20 stops resending the MAC address clear request anymore (S1406).

In a manner similar to Step S1402, the MAC address clear request processing part S211 of the network device 20 generates a MAC address clear request packet in which "3" is stored in VNI 802, and a sequence number based on the destination IP address (destination VTEP) is stored in Sequence Number 1201. The sequence number "2" is assigned to the IP address "IP-B". The sequence number "4" is assigned to the IP address "IP-E".

The MAC address clear request processing part S211 sends out the generated MAC address clear request packet to the other end of the tunnel connection of VNI "3." Specifically, the layer 3 packet transfer part K231 outputs the generated MAC address clear request packet from the physical port "IF24" to the IP address "IP-B." (S1407).

Since IP-B is assigned to the network device 10, the network device 10 receives the MAC address clear request packet including VNI "3" from the network device 20. Since IP-E is assigned to the network device 30, the network device 30 receives the MAC address clear request packet including VNI "3" from the network device 20 (S1408).

After receiving the MAC address clear request packet in Step S1408, the network device 10 conducts Steps S901, S1301, and S902, and then identifies a VTEP to be subjected to deletion based on the source IP address in the received MAC address clear request packet, and identifies a VNI to be subjected to deletion from the VNI stored in the MAC address clear request packet.

Since the source IP address is IP-D according to the received MAC address clear request packet, a VTEP to which IP-D is assigned is identified as the VTEP to be deleted. Also, according to the received MAC address clear request, the VNI to be deleted is "3."

The MAC address clear request processing part S211 of the network device 10 notifies the MAC address control part S212 of the output interface and VNI to be deleted. According to FIG. 14, the destination IP address of the VTEP of the output interface to be deleted is IP-D, and the VNI is "3."

The MAC address control part S212 of the network device 10 deletes entries from the MAC address table T223 based on the notified information. According to FIG. 6, the MAC address control part S212 deletes entries in which MAC address F602 is MAC-F (S1409).

The MAC address clear request processing part S211 of the network device 10 sends out a response message for the MAC address clear request packet to the network device 20 which is the sender of the request packet (S1410).

If a response message is not received within a predetermined period of time since the last MAC address clear request packet was sent out, the MAC address clear request processing part S211 of the network device 20 resends the MAC address clear request packet. The content of the packet is the same as that of the MAC address clear request packet sent in Step S1407 (S1411).

When the MAC address clear request packet is received by the MAC address clear request processing part S211 of the network device 10 in Step S1412, because the sequence number of the MAC address clear request packet is "2," which is the same as the packet that was received in Step S1408, the network device 10 ends the processing without conducting any processing (S1412).

After receiving a response message for the MAC address table clear request, the MAC address clear request processing part S211 of the network device 20 stops resending the MAC address clear request packet (S1413).

B6. Effects of Embodiment 2

As described above, in the communication method of Embodiment 2, the MAC address clear request packet can be delivered to the destination more reliably, and therefore, it is possible to ensure that the MAC address clear request reaches the destination without fail, in addition to the effects of Embodiment 1. Furthermore, since the MAC address clear request packet will not be resent after receiving a response, it is possible to prevent unnecessary transmission.

Embodiment 3

C1. System Configuration

The system configuration of Embodiment 3 is the same as the system configuration of Embodiment 1 of FIG. 1. The configuration of Embodiment 3 described below can be applied to Embodiment 2.

C2. Configuration of Network Device

The configuration of the network devices of Embodiment 3 is the same as the configuration of the network devices of Embodiment 1 shown in FIG. 2.

C3. Content of Table

The content of tables of Embodiment 3 is the same as the content of tables of Embodiment 1 shown in FIGS. 3A to 3C, FIGS. 4A to 4C, FIG. 5, and FIG. 6.

C4. MAC Address Clear Request Sending Processing by Device that Detected Failure FIG. 15 is a flowchart showing an example of the MAC address clear request sending processing which is conducted by the software processing module M201 when a failure is detected in Embodiment 3.

The MAC address clear request sending processing of Embodiment 3 differs from the MAC address clear request sending processing of Embodiment 1 in that a plurality of VNIs are set in the MAC address clear request packet.

Figure 15:
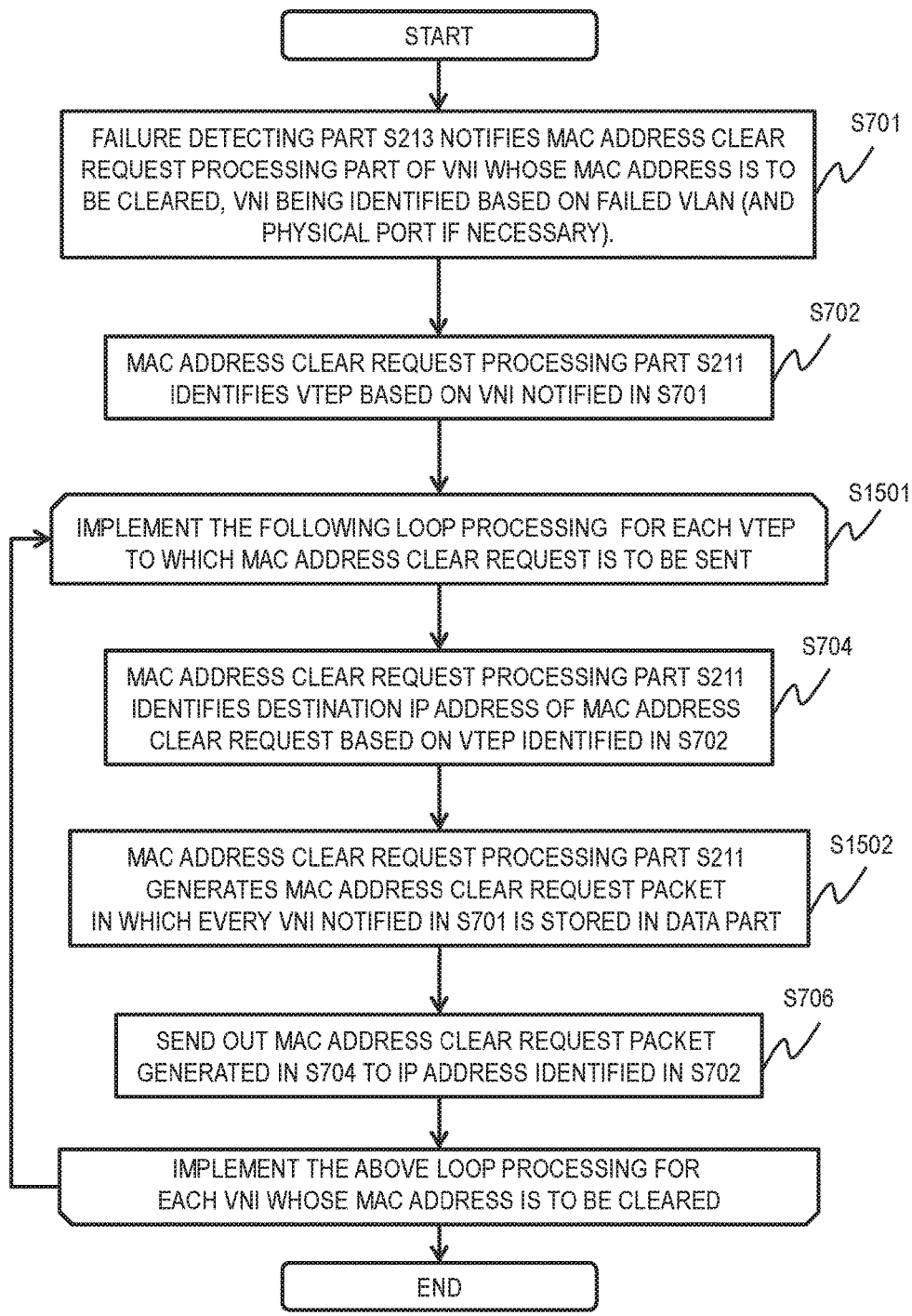
FIG. 15 is a flowchart showing an example of the MAC address clear request sending processing which is conducted by the software processing module when a failure is detected in Embodiment 3.

In a manner similar to the processing shown in FIG. 7, the processing of FIG. 15 includes Steps S701, S702, S704, and S705. The processing shown in FIG. 15 also includes Steps S1501 and S1502, which differs from Embodiment 1.

In Embodiment 1, if a plurality of VNIs are notified in Step S701, the MAC address clear request processing part S211 repeats the processing for each of the plurality of VNIs. In Embodiment 3, however, if a plurality of VNIs are notified in Step S701, the MAC address clear request processing part S211 repeats the processing for each of the VTEPs that include the respective VNIs. More specifically, the MAC address clear request processing part S211 of Embodiment 3 is configured to store a plurality of VNIs in one MAC address clear request packet, thereby reducing the number of repetition.

After Step S702, if the same VNIs belong to a VTEP that was identified based on the VNIs notified in Step S701, or in other words, if the failed virtual networks belong to one VTEP, the MAC address clear request processing part S211 of Embodiment 3 repeats the processing of Steps S704, S1502, and S706 for each VTEP (S1501).

By conducting Steps S704, S1502, and S706, the network device 20 generates one MAC address clear request packet including a plurality of VNIs for each VTEP and sends out the packet.

Figure 16:
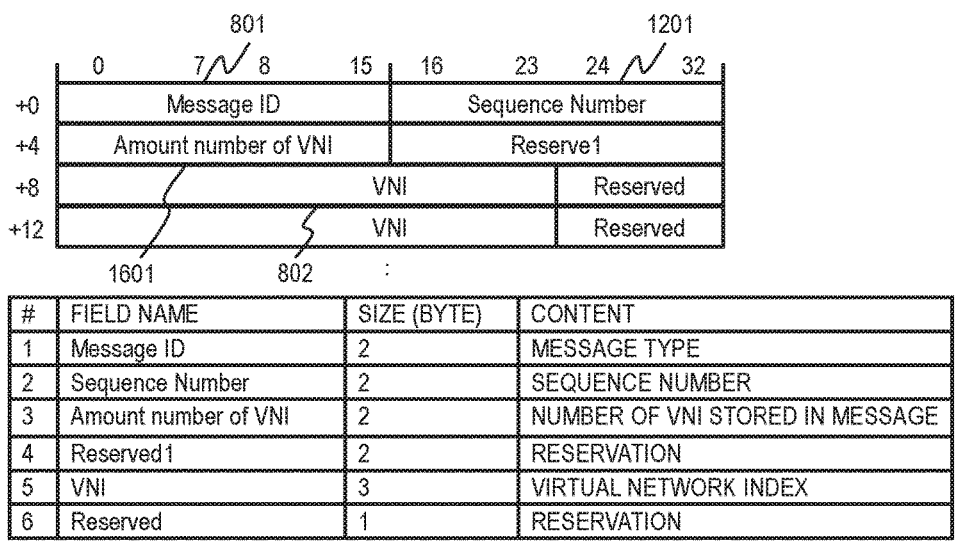
FIG. 16 is an explanatory diagram showing an example of the packet format of the MAC address clear request packet of Embodiment 3.

FIG. 16 is an explanatory diagram showing an example of the packet format of the MAC address clear request packet of Embodiment 3.

In a manner similar to Embodiment 1, the MAC address clear request packet of Embodiment 3 includes Message ID 801 and VNI 802. The MAC address clear request packet of Embodiment 3 also includes Number of Stored VNI 1601, which differs from Embodiment 1. The MAC address clear request packet of Embodiment 3 may include Sequence Number 1201 as in Embodiment 2.

Number of Stored VNI 1601 indicates the number of VNIs included in one MAC address clear request packet.

After Step S704, the MAC address clear request processing part S211 generates a MAC address clear request packet in which the number of VNIs is stored in Number of VNI 1601 and the VNIs notified in Step S701 are stored in VNI 802, in accordance with the packet format shown in FIG. 16 (S1502).

After Step S1502, the MAC address clear request processing part S211 sends out a MAC address clear request packet in S706. By conducting Steps S1501, S704, S1502, and S706, the MAC address clear request processing part S211 sends out a MAC address clear request packet including at least one VNI for each VTEP that includes a failed VLAN.

C5. MAC Address Table Clear Processing

Figure 17:
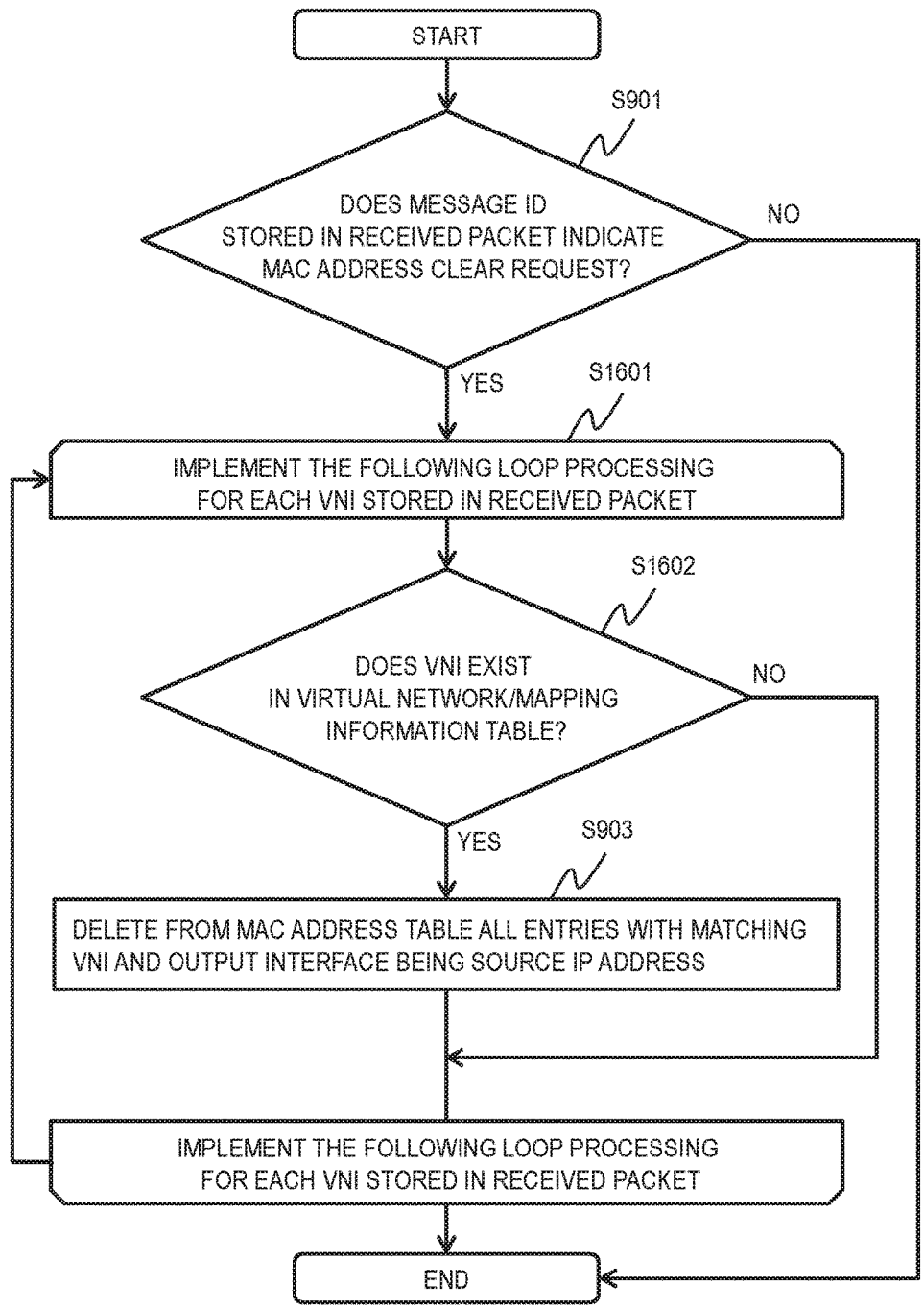
FIG. 17 is a flowchart showing an example of the MAC address table clear processing conducted by the software processing module when receiving a MAC address clear request packet in Embodiment 3.

FIG. 17 is a flowchart showing an example of the MAC address table clear processing conducted by the software processing module M201 when receiving a MAC address clear request packet in Embodiment 3.

The MAC address table clear processing of Embodiment 3 differs from Embodiment 1 in that Step S903 is repeated for the number of VNIs stored in the MAC address clear request packet. In a manner similar to the processing shown in FIG. 9, the processing of FIG. 17 includes Steps S901 and S903. The processing shown in FIG. 17 also includes Steps S1601 and S1602, which differs from the processing shown in FIG. 9.

After receiving the MAC address clear request packet in Step S901, the MAC address clear request processing part S211 determines whether the received MAC address clear request packet includes a plurality of VNIs or not. If the received MAC address clear request packet includes a plurality of VNIs, the MAC address clear request processing part S211 repeats S1602 for the number of VNIs. (S1601).

In Step S1601, the MAC address clear request processing part S211 identifies one VNI that has not undergone Step S1602, among the VNIs included in the MAC address clear request packet.

The MAC address clear request processing part S211 refers to the virtual network/mapping information table T222 and determines whether or not the VNI identified in Step S1601 belongs to the VTEP for which the MAC address clear request packet was generated (S1602).

If the VNI identified in Step S1601 does not belong to the VTEP for which the MAC address clear request packet was generated, it is not necessary to clear a MAC address, and therefore, the MAC address clear request processing part S211 returns to Step S1601, and identifies a new VNI from the MAC address clear request packet.

If the VNI identified in Step S1601 belongs to the VTEP for which the MAC address clear request packet was generated, the MAC address clear request processing part S211 conducts Step S903 to clear the MAC address.

Figure 18:
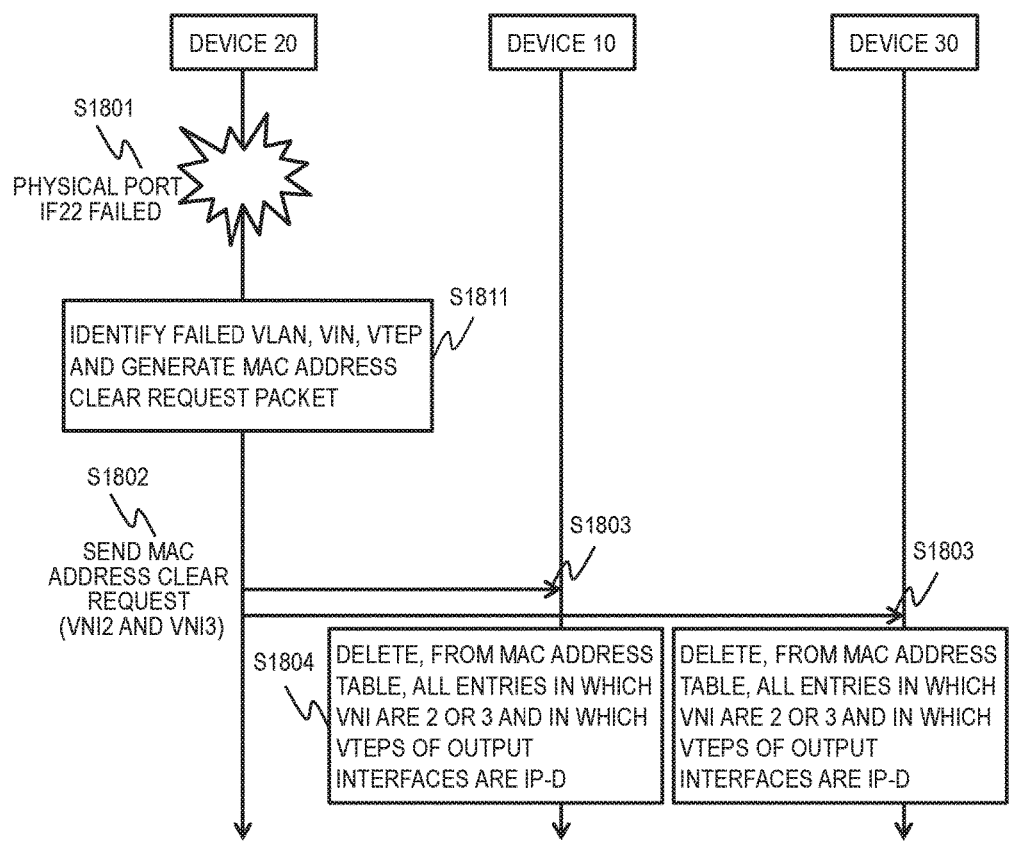
FIG. 18 is a sequence diagram showing an example of processing when a physical port fails in the network device in Embodiment 3.

FIG. 18 is a sequence diagram showing an example of processing when a physical port fails in the network device 20 in Embodiment 3. The processing flow is explained below with reference to FIGS. 3A to 3C, FIGS. 4A to 4C, FIG. 5, FIG. 6, and FIG. 10.

In a manner similar to Step S1001 of FIG. 10, the failure detecting part S213 of the network device 20 detects a failure of the physical port "IF22" (S1801) and notifies the MAC address clear request processing part S211 of the VNI of the failed physical port (corresponding to Step S701).

After receiving the VNI information, the MAC address clear request processing part S211 refers to the virtual network/mapping information table T222, and identifies a VTEP whose MAC address is to be cleared (corresponding to Step S702).

According to the virtual network/mapping information table T222 shown in FIG. 3B, in the entry in which Port Number F304 is "IF22," VLAN ID F305 indicates "201" and "202." In the entry in which Port Number F304 is "IF22" and VLAN ID F305 is "201," VNI F303 uniquely indicates "2."

Similarly, in the entry in which Port Number F304 is "IF22" and VLAN ID F305 is "202," VNI F303 indicates "3." VNI "2" and VNI "3" are included in VTEP "22." Thus, the MAC address clear request processing part S211 identifies VTEP "22" as the VTEP whose MAC address is to be cleared.

The MAC address clear request processing part S211 of the network device 20 refers to the tunnel information table T224, and identifies a destination IP address of the MAC address clear request (corresponding to Step S704). According to the tunnel information table T224 of FIG. 4B, the IP addresses of the VTEP to which VTEP "22" is connected are IP-B and IP-E.

Then the MAC address clear request processing part S211 of the network device 20 generates a MAC address clear request packet that includes the VNI identified in Step S701 and the destination IP addresses identified in Step S704 (corresponding to Step S1502). The MAC address clear request processing part S211 of Embodiment 3 stores a plurality of VNIs belonging to the same VTEP in one MAC address clear request packet.

Step S1811 corresponds to Steps S701, S702, S1501, S704, and S1502 shown in FIG. 17.

The MAC address clear request processing part S211 of the network device 20 generates a MAC address clear request packet in which "2" and "3" are stored under VNI 802.

According to the routing information table T221 shown in FIG. 5, in the entry in which Destination Route F501 is IP-B, Next Hop Address F503 is IP-B and Output Port Number F504 is "IF24." In the entry in which Destination Route F501 is IP-E, Next Hop Address F503 is IP-E and Output Port Number F504 is "IF24."

Thus, the MAC address clear request processing part S211 of the network device 20 sends out the MAC address clear request packet to the network device 30 via the relay processing module M202 and the physical port "IF24." Specifically, in a manner similar to Step S1002, the generated MAC address clear request packet is sent to IP-B and IP-E, which are the IP addresses to which VTEP "22" is tunnel-connected via the physical port "IF24." (S1802).

Step S1802 differs from Step S1002 in that the MAC address clear request packet includes a plurality of VNIs. In Step S1803, the network device 10 and the network device 30 respectively receive the MAC address clear request packet in a manner similar to Step S1003.

After receiving the MAC address clear request packet in Step S1803, the MAC address clear request processing part S211 of the network device 10 identifies a VTEP to be subjected to deletion based on the source IP address in the received MAC address clear request packet, and identifies VNIs to be subjected to deletion from the VNIs stored in the MAC address clear request packet. According to the received MAC address clear request packet, the source IP address is IP-D, and the VNIs to be deleted are "2" and "3."

The MAC address clear request processing part S211 of the network device 10 notifies the MAC address control part S212 of the output interface (source IP address) and VNIs to be deleted. According to FIG. 18, in the output interface to be deleted, the destination IP address of VTEP is IP-D, and VNI is "2" or "3."

The MAC address control part S212 of the network device 10 deletes the specified MAC address from the MAC address table T223. According to FIG. 6, the MAC address control part S212 deletes entries in which MAC address F602 is MAC-E or MAC-F (S1804).

C6. Effects of Embodiment 3

As described above, in the communication method of Embodiment 3, it is possible to reduce the number of messages in the MAC address clear request packet, in addition to the effects of Embodiment 1.

In the network device of Embodiment 3, a plurality of VNIs are stored in one MAC address clear request packet, but this processing may also be applied to the network device of Embodiment 2. Specifically, the network device of Embodiment 3 may be configured to include a sequence number in the MAC address clear request packet so that the MAC address clear request packet is continuously sent a predetermined number of times until a response message is received.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A network device configured to relay communication, the network device comprising:
   a processor and a memory,
   wherein the network device communicates with a terminal using a Layer 2 protocol and communicates with another network device via a physical port using a Layer 3 protocol,
   wherein the network device has a virtual network on which communication with the terminal is conducted,
   wherein the network device has a virtual tunnel end point that relays the communication on the virtual network to said another network device via the physical port,
   wherein the memory stores tunnel information that indicates a virtual tunnel end point of the network device and that indicates a virtual tunnel end point of said another network device that communicates with said virtual tunnel end point of the network device,
   wherein the memory stores mapping information that includes a virtual network identifier unique to a combination of the physical port and the virtual network and that includes an identifier of a virtual tunnel end point that relays communication on the virtual network, and
   wherein the processor is configured to:
   detect a virtual network that is unable to relay communication as a failed virtual network;
   identify, as a failed virtual network identifier, a virtual network identifier assigned to a combination of the failed virtual network and a physical port through which communication of the failed virtual network pass, based on the mapping information;
   identify a first virtual tunnel end point that relays communication of the failed virtual network;
   identify a second virtual tunnel end point of another network device that communicates with the first virtual tunnel end point based on the tunnel information; and
   send, to the second virtual tunnel end point, a clear request including the failed virtual network identifier and an IP address of the first virtual tunnel end point, the clear request being used for clearing a MAC address used in the Layer 2 protocol.

2. The network device according to claim 1,
   wherein the processor is configured to send the clear request to the second virtual tunnel end point for a predetermined number of times unless the processor receives a response message to the clear request.

3. The network device according to claim 2,
   wherein the network device includes a plurality of virtual networks, and
   wherein the processor is configured to:
   identify a plurality of virtual networks that are unable to relay communication as a plurality of failed virtual networks;
   identify the failed virtual network identifier for each of the failed virtual networks, based on the mapping information;
   identify the first virtual tunnel end point for each of the failed virtual networks;
   identify the second virtual tunnel end point that communicates with the first virtual tunnel end point for each of the failed virtual networks based on the tunnel information; and
   send, to the second virtual tunnel end point, a clear request that includes the failed virtual network identifier and an IP address of the first virtual tunnel end point for each of the failed virtual networks.

4. The network device according to claim 2,
   wherein the network device includes a plurality of virtual networks, and
   wherein the processor is configured to:
   identify a plurality of virtual networks that are unable to relay communication as a plurality of failed virtual networks;
   identify the failed virtual network identifier for each of the failed virtual networks, based on the mapping information;
   identify the first virtual tunnel end point for each of the failed virtual networks;
   identify the second virtual tunnel end point that communicates with the first virtual tunnel end point for each of the failed virtual networks based on the tunnel information;
   generate, when the plurality of failed virtual networks belong to a single first virtual end point, one clear request that include a plurality of failed virtual network identifiers indicating the plurality of failed virtual networks and an IP address of said first virtual tunnel end point; and
   send the generated single clear request to the second virtual tunnel end point.

5. The network device according to claim 2,
   wherein the virtual network is VLAN,
   wherein the virtual tunnel end point is VTEP, and
   wherein the virtual network identifier is VNI.

6. A communication method by a network device,
   wherein the network device communicates with a terminal using a Layer 2 protocol and communicates with another network device via a physical port using a Layer 3 protocol,
   wherein the network device has a virtual network on which communication with the terminal is conducted,
   wherein the network device has a virtual tunnel end point that relays the communication on the virtual network to said another network device via the physical port, and
   wherein the communication method comprising:
   detecting, by the network device, a virtual network that is unable to relay communication as a failed virtual network;

identifying, by the network device, as a failed virtual network identifier, a virtual network identifier assigned to a combination of the failed virtual network and a physical port through which communication of the failed virtual network pass, based on mapping information, the mapping information that includes a virtual network identifier unique to a combination of the physical port and the virtual network and that includes an identifier of a virtual tunnel end point that relays communication on the virtual network;

identifying, by the network device, a first virtual tunnel end point that relays communication of the failed virtual network;

identifying, by the network device, a second virtual tunnel end point of another network device that communicates with the first virtual tunnel end point based on tunnel information, the tunnel information that indicates a virtual tunnel end point of the network device and that indicates a virtual tunnel end point of said another network device that communicates with said virtual tunnel end point of the network device; and sending, by the network device, to the second virtual tunnel end point, a clear request including the failed virtual network identifier and an IP address of the first virtual tunnel end point and being used for clearing a MAC address used in the Layer 2 protocol.

7. The communication method according to claim 6,
wherein the communication method further comprising sending, by the network device, the clear request to the second virtual tunnel end point for a predetermined number of times unless a response message to the clear request is received.

8. The communication method according to claim 7,
wherein the network device includes a plurality of virtual networks, and
wherein the communication method further comprising:
identifying, by the network device, a plurality of virtual networks that are unable to relay communication as a plurality of failed virtual networks;
identifying, by the network device, the failed virtual network identifier for each of the failed virtual networks, based on the mapping information;
identifying, by the network device, the first virtual tunnel end point for each of the failed virtual networks;
identifying, by the network device, the second virtual tunnel end point that communicates with the first virtual tunnel end point for each of the failed virtual networks based on the tunnel information; and
sending, by the network device, to the second virtual tunnel end point, a clear request that includes the failed virtual network identifier and an IP address of the first virtual tunnel end point for each of the failed virtual networks.

9. The communication method according to claim 7,
wherein the network device includes a plurality of virtual networks, and
wherein the communication method further comprising:
identifying, by the network device, a plurality of virtual networks that are unable to relay communication as a plurality of failed virtual networks;
identifying, by the network device, the failed virtual network identifier for each of the failed virtual networks, based on the mapping information;
identifying, by the network device, the first virtual tunnel end point for each of the failed virtual networks;
identifying, by the network device, the second virtual tunnel end point that communicates with the first virtual tunnel end point for each of the failed virtual networks based on the tunnel information;

generating, by the network device, when the plurality of failed virtual networks belong to a single first virtual end point, one clear request that include a plurality of failed virtual network identifiers indicating the plurality of failed virtual networks and an IP address of said first virtual tunnel end point; and sending, by the network device, the generated single clear request to the second virtual tunnel end point.

10. The communication method according to claim 7,
wherein the virtual network is VLAN,
wherein the virtual tunnel end point is VTEP, and
wherein the virtual network identifier is VNI.

11. A network system configured to relay communication, the network system comprising:
a first network device and a second network device,
wherein the first network device and the second network device communicate with a terminal using a Layer 2 protocol and communicate with each other via a physical port using a Layer 3 protocol,
wherein the first network device and the second network device have a virtual network on which communication with the terminal is conducted,
wherein the first network device and the second network device have a virtual tunnel end point that relays the communication on the virtual network to another network device via the physical port,
wherein the first network device has a processor and a memory,
wherein the memory stores tunnel information that indicates a virtual tunnel end point of the first network device, and a virtual tunnel end point of the second network device that communicates with the virtual tunnel end point of the first network device,
wherein the memory stores mapping information that includes a virtual network identifier unique to a combination of the physical port and the virtual network and that includes an identifier of the virtual tunnel end point that relays communication on the virtual network,
wherein the processor is configured to:
detect a virtual network that is unable to relay communication as a failed virtual network;
identify, as a failed virtual network identifier, a virtual network identifier assigned to a combination of the failed virtual network and a physical port through which communication of the failed virtual network pass, based on the mapping information;
identify a first virtual tunnel end point that relays communication of the failed virtual network;
identify a second virtual tunnel end point of the second network device that communicates with the first virtual tunnel end point based on the tunnel information; and
send, to the second virtual tunnel end point, a clear request including the failed virtual network identifier and an IP address of the first virtual tunnel end point and being used for clearing a MAC address used in the Layer 2 protocol,
wherein the second network device has a processor and a memory;
wherein the memory of the second network device stores MAC address information that indicates an MAC address used for the communication with a first terminal, which communicates with the second network device, the virtual network identifier that indicates the virtual network on which the communication with the first terminal is conducted, and an IP address of the virtual tunnel end point on which the communication with the first terminal is conducted, and wherein the processor of the second network device is configured to delete, from the MAC address information, an MAC address of a terminal conducting communication on the failed virtual network, based on the failed virtual network identifier, the IP address of the first virtual tunnel end point, and the MAC address information.

12. The network system according to claim 11, wherein the processor of the first network device is configured to send the clear request to the second virtual tunnel end point for a predetermined number of times unless the processor receives a response message to the clear request.

13. The network system according to claim 12, wherein the first network device includes a plurality of virtual networks, and wherein the processor of the first network device is configured to:

identify a plurality of virtual networks that are unable to relay communication as a plurality of failed virtual networks;

identify the failed virtual network identifier for each of the failed virtual networks, based on the mapping information;

identify the first virtual tunnel end point for each of the failed virtual networks;

identify the second virtual tunnel end point that communicates with the first virtual tunnel end point for each of the failed virtual networks based on the tunnel information; and send, to the second virtual tunnel end point, a clear request that includes the failed virtual network identifier and an IP address of the first virtual tunnel end point for each of the failed virtual networks.

14. The network system according to claim 12, wherein the first network device includes a plurality of virtual networks, and wherein the processor of the first network device is configured to:

identify a plurality of virtual networks that are unable to relay communication as a plurality of failed virtual networks;

identify the failed virtual network identifier for each of the failed virtual networks, based on the mapping information;

identify the first virtual tunnel end point for each of the failed virtual networks;

identify the second virtual tunnel end point that communicates with the first virtual tunnel end point for each of the failed virtual networks based on the tunnel information;

generate, when the plurality of failed virtual networks belong to a single first virtual end point, one clear request that include a plurality of failed virtual network identifiers indicating the plurality of failed virtual networks and an IP address of said first virtual tunnel end point; and send the generated single clear request to the second virtual tunnel end point.

15. The network system according to claim 12, wherein the virtual network is VLAN, wherein the virtual tunnel end point is VTEP, and wherein the virtual network identifier is VNI.

* * * * *